(12) United States Patent
Hakoda et al.

(10) Patent No.: US 9,791,922 B2
(45) Date of Patent: Oct. 17, 2017

(54) USER INTERFACE CONTROL DEVICE, USER INTERFACE CONTROL METHOD, COMPUTER PROGRAM AND INTEGRATED CIRCUIT

(75) Inventors: Kotaro Hakoda, Osaka (JP); Osamu Yamaji, Osaka (JP); Shinsuke Ogata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 883 days.

(21) Appl. No.: 13/808,145

(22) PCT Filed: Aug. 10, 2012

(86) PCT No.: PCT/JP2012/005109
§ 371 (c)(1),
(2), (4) Date: Jan. 3, 2013

(87) PCT Pub. No.: WO2013/054462
PCT Pub. Date: Apr. 18, 2013

(65) Prior Publication Data
US 2013/0293469 A1 Nov. 7, 2013

(30) Foreign Application Priority Data

Oct. 13, 2011 (JP) ................................ 2011-226092

(51) Int. Cl.
*G09G 1/00* (2006.01)
*G06F 3/01* (2006.01)
(Continued)

(52) U.S. Cl.
CPC .............. *G06F 3/013* (2013.01); *G06T 19/00* (2013.01); *H04N 13/004* (2013.01);
(Continued)

(58) Field of Classification Search
CPC ...... G06F 3/013; H04N 5/265; H04N 13/004; H04N 13/0022; H04N 13/003; H04W 88/02; G09G 3/003; G09G 2310/061
See application file for complete search history.

(56) References Cited

U.S. PATENT DOCUMENTS

2006/0143020 A1* 6/2006 Zaima ................ H04N 13/0003
382/154
2009/0219383 A1* 9/2009 Passmore ........................ 348/44
(Continued)

FOREIGN PATENT DOCUMENTS

| JP | 2004-145832 | 5/2004 |
|----|-------------|--------|
| JP | 2005-078424 | 3/2005 |
| JP | 2009-230431 | 10/2009 |

*Primary Examiner* — Michael Faragalla
(74) *Attorney, Agent, or Firm* — Greenblum & Bernstein, P.L.C.

(57) ABSTRACT

A user interface control device provides a GUI allowing a depth of a graphic to be easily set when composing the graphic with a stereoscopic image. The device comprises: a graphic information obtaining unit that specifies an area occupied by the graphic when the graphic is arranged on one of two viewpoint images forming a stereoscopic image; a depth information analyzing unit that acquires a depth of a subject appearing within the specified area occupied by the graphic in the one viewpoint image; and a depth setting presenting unit that presents a first alternative and a second alternative for setting a depth of the graphic, the first alternative corresponding to the depth of the subject, and the second alternative corresponding to a depth differing for the depth of the subject.

18 Claims, 22 Drawing Sheets

(51) Int. Cl.
  *G06T 19/00*  (2011.01)
  *H04N 13/00*  (2006.01)
  *H04N 13/02*  (2006.01)
  *H04N 13/04*  (2006.01)

(52) U.S. Cl.
  CPC ....... *H04N 13/007* (2013.01); *H04N 13/0022* (2013.01); *H04N 13/0275* (2013.01); *H04N 13/0452* (2013.01); *H04N 13/0497* (2013.01); *H04N 2013/0081* (2013.01); *H04N 2013/0092* (2013.01)

(56) References Cited

U.S. PATENT DOCUMENTS

2010/0080448 A1* 4/2010 Tam ................. G06T 7/0051
                                                    382/154
2011/0234760 A1* 9/2011 Yang ................ H04N 13/0048
                                                    348/46
2012/0083312 A1* 4/2012 Kim ................. G02B 13/001
                                                    455/556.1

* cited by examiner

USER INTERFACE CONTROL DEVICE, USER INTERFACE CONTROL METHOD, COMPUTER PROGRAM AND INTEGRATED CIRCUIT

TECHNICAL FIELD

The present invention relates to user interface art, and in particular to user interface display during processing of stereoscopic images.

BACKGROUND ART

In recent years, stereoscopic image display art that uses binocular disparity has attracted attention. Humans perceive three dimensions by differences in left-eye and right-eye retinal images. In the above recited art images exhibiting a disparity (a left-view image and a right-view image) are isolated and focused into the left and right eyes of a viewer respectively creating a disparity between an object image formed on the retina of the left eye and an object image formed on the retina of the right eye, which gives a perception of depth. Devices capable of taking stereoscopic photographs are expected to further increase in number, these devices not being limited only to digital cameras, but also including other devices such as smart phones.

With the increasing spread of the stereoscopic image display art one challenge is to provide users with a new experience of processing stereoscopic images in addition to the traditional experiences of capturing and viewing stereoscopic images. For example Patent Literature 1 discloses an art for arranging graphics such as speech bubbles or letters on a stereoscopic image, captured by a camera or other device, and creating a composite image. More specifically, the art disclosed in Patent Literature 1 achieves a stereoscopic effect by determining relative sizes and depths of a plurality of graphics in accordance with depth information (a depth map) for the stereoscopic image at an arrangement position of each of the graphics.

CITATION LIST

Patent Literature

[Patent Literature 1]
Japanese Patent Application Publication No. 2009-230431

SUMMARY OF INVENTION

Technical Problem

However, the art disclosed in Patent Literature 1, provides no method for the user to designate depth information for the graphics. According to the above art, when processing a photograph it is not possible for the user to indicate at what depth a graphic should be positioned, therefore a problem occurs of the user not being able to process the photograph as desired.

Furthermore, it is not necessarily the case that processing of a stereoscopic image will be performed while the image is displayed in stereoscopic form. Processing can also be performed on viewpoint images that form the stereoscopic image while in planar display form. Therefore, there is demand for a method in which depth information for composing graphics can be easily indicated, even when processing a stereoscopic image using a device incapable of stereoscopic display on which viewpoint images are displayed in planar form.

In view of the above problem, the present invention aims to provide a user interface control device, a user interface control method, a computer program for controlling a user interface, and an integrated circuit, for providing a GUI that, when composing a graphic with a stereoscopic image, enables easy setting of a depth at which to position the graphic in the stereoscopic image.

Solution to Problem

In order to solve the above problem, one aspect of the present invention is a user interface control device that provides a user interface for setting, when composing a graphic with a stereoscopic image, a depth at which to position the graphic in the stereoscopic image, the user interface control device comprising: a planar position specifying unit configured to specify with respect to a graphic arranged on one of two viewpoint images forming a stereoscopic image, an area occupied by the graphic in the one viewpoint image; a viewpoint image depth acquiring unit configured to acquire a depth of a subject appearing within the area occupied by the graphic in the one viewpoint image; and a presenting unit configured to present a first alternative and a second alternative for setting a depth of the graphic in the stereoscopic image, the first alternative corresponding to the depth of the subject, and the second alternative corresponding to a depth differing from the depth of the subject.

Advantageous Effects of Invention

Through the configuration recited in Solution to Problem above, the user interface control device relating to the one aspect of the present invention enables easy setting of the depth of the graphic, by providing a user with alternatives for the depth of the graphic based on a depth information distribution for a planar position at which the graphic is arranged.

Furthermore, in the user interface control device relating to the one aspect of the present invention recited above, because the depth of the graphic can be set by selection of one of the alternatives, the depth of the graphic can be easily set regardless of whether image processing is performed in stereoscopic or planar display form.

Figure 1:
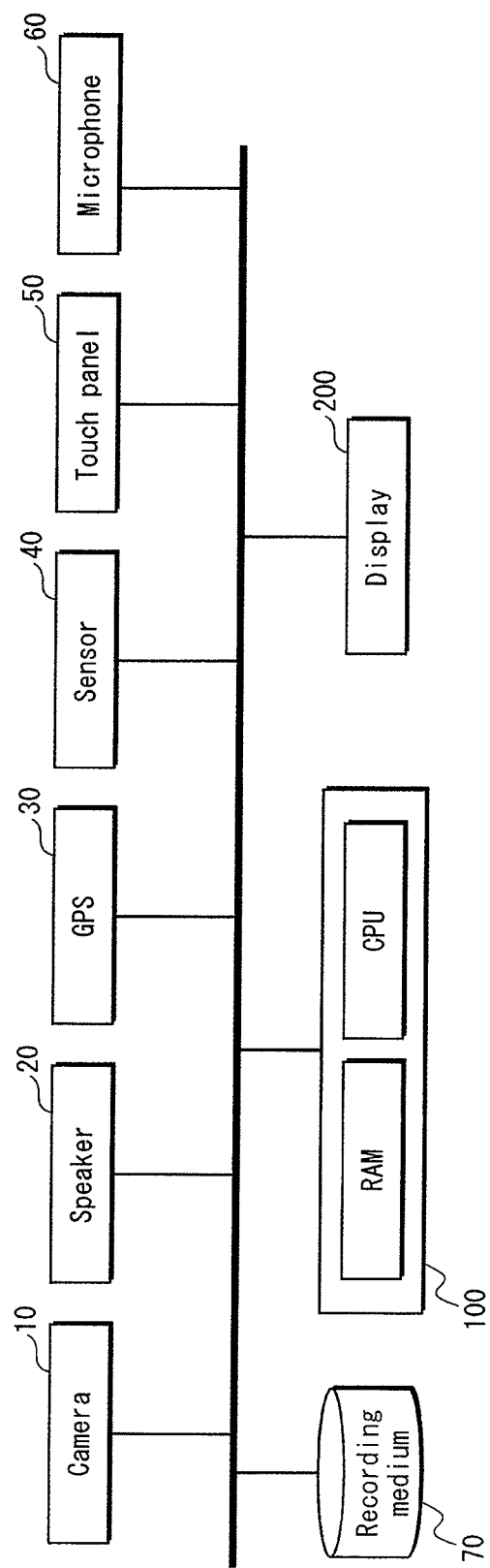
FIG. 1 is a block diagram showing a hardware configuration of a smart phone which has a function of a user interface control device relating to a first embodiment.

EMBODIMENTS OF THE INVENTION (Outline of Aspects of the Invention)

The present invention aims to provide a user interface control device, a user interface control method, a computer program for controlling a user interface and an integrated circuit, for providing a GUI that enables easy setting of a depth at which a graphic should be displayed after composition when composing the graphic with a stereoscopic image.

A first aspect of the present invention is a user interface control device that provides a user interface for setting, when composing a graphic with a stereoscopic image, a depth at which to position the graphic in the stereoscopic image, the user interface control device comprising: a planar position specifying unit configured to specify with respect to a graphic arranged on one of two viewpoint images forming a stereoscopic image, an area occupied by the graphic in the one viewpoint image; a viewpoint image depth acquiring unit configured to acquire a depth of a subject appearing within the area occupied by the graphic in the one viewpoint image; and a presenting unit configured to present a first alternative and a second alternative for setting a depth of the graphic in the stereoscopic image, the first alternative corresponding to the depth of the subject, and the second alternative corresponding to a depth differing from the depth of the subject.

According to the configuration recited above, based on a depth information distribution for a planar position at which the graphic is arranged, a user is provided with alternatives for the depth at which to position the graphic, and therefore the depth of the graphic can be easily set by selection of one of the alternatives. Furthermore, according to the configuration recited above, because the depth of the graphic can be set by selection of one of the alternatives, the depth of the graphic can be easily set regardless of whether image processing is performed in stereoscopic or planar display form.

In the first aspect, according to a second aspect of the present invention, the first alternative may correspond to a depth of a subject of smallest depth among one or more subjects appearing within the area occupied by the graphic, and the second alternative may correspond to a smaller depth than the depth of the subject of smallest depth.

According to the configuration relating to the second aspect of the present invention recited above, the user can easily select whether to compose a stereoscopic image with the graphic pasted onto the subject, or whether to compose the stereoscopic image with the graphic positioned in front of the subject at the smaller depth.

In the second aspect, according to a third aspect of the present invention, when another subject appears within the area occupied by the graphic in addition to the subject of smallest depth, and a difference between the depth of the subject of smallest depth and a depth of the other subject is greater than a threshold value, the presenting unit may further present a third alternative for setting the depth of the graphic, the third alternative corresponding to a depth intermediate between the depth of the subject of smallest depth and the depth of the other subject.

According to the configuration relating to the third aspect of the present invention, in addition to the first alternative and the second alternative for setting the depth of the graphic in the second aspect, the user is also able to select a composition where the graphic is positioned at a depth intermediate between the two subjects by selecting the third alternative.

In the third aspect, according to a fourth aspect of the present invention, the user interface control device may further comprise: a receiving unit configured to receive a selection by a user of one of the first alternative, the second alternative and the third alternative; a scaling display unit configured to, when the selection of the one alternative is received, repeatedly change a display size of the graphic until a determining command is received from the user; and a depth determining unit configured to determine the graphic to have a depth smaller than a depth corresponding to the selected alternative when the determining command is received while the display size of the graphic is enlarged, and determine the graphic to have a depth greater than the depth corresponding to the selected alternative when the determining command is received while the display size of the graphic is reduced.

According to the configuration relating to the fourth aspect of the present invention, the depth of the graphic is not limited to depths corresponding to the alternatives, and instead the depth of the graphic can be adjusted to a smaller depth or a greater depth than the depth corresponding to each of the alternatives. Therefore, the user has greater freedom to select the depth of the graphic and usability is improved. Furthermore, it is possible to repeatedly change the display size of the graphic while in planar display form, thus the depth of the graphic can be easily set even when stereoscopic display is not possible.

In the fourth aspect, according to a fifth aspect of the present invention, when selection of the third alternative is received, the depth determining unit may determine the depth of the graphic, based on the display size of the graphic at the time of reception of the determining command, by setting a display size of the graphic at maximum enlargement to correspond to the depth of the subject of smallest depth, and a display size of the graphic at maximum reduction to correspond to the depth of the other subject.

According to the configuration relating to the fifth aspect of the present invention, through correspondence of the display size of the graphic to a range of depths between the two subjects, the user can intuitively set the depth of the graphic between the depths of the two subjects.

In the fourth aspect, according to a sixth aspect of the present invention, when one of the subjects appears within the area occupied by the graphic at a greater depth than the depth corresponding to the selected alternative, the depth determining unit may determine the depth of the graphic, based on the display size of the graphic at the time of reception of the determining command, by setting a display size of the graphic at maximum reduction to correspond to the depth of the subject at the greater depth than the depth corresponding to the selected alternative.

According to the configuration relating to the sixth aspect of the present invention, the display size of the graphic can be set to correspond to a range of depths between the depth corresponding to the selected alternative and the depth of the subject at the greater depth. Thus, the user can intuitively set the depth of the graphic between the depth corresponding to the selected alternative and the depth of the subject at the greater depth.

In the fourth aspect, according to a seventh aspect of the present invention, when one of the subjects appears within the area occupied by the graphic at a smaller depth than the depth corresponding to the selected alternative, the depth determining unit may determine the depth of the graphic, based on the display size of the graphic at the time of reception of the determining command, by setting a display size of the graphic at maximum enlargement to correspond to the depth of the subject at the smaller depth than the depth corresponding to the selected alternative, and when no subject appears within the area occupied by the graphic at a smaller depth than the depth corresponding to the selected alternative, the depth determining unit may determine the depth of the graphic, based on the display size of the graphic at the time of reception of the determining command, by setting the display size of the graphic at maximum enlargement to correspond to a depth smaller than the depth corresponding to the selected alternative by a predetermined amount.

According to the configuration relating to the seventh aspect of the present invention, the display size of the graphic can be set to correspond to a range of depths between the depth corresponding to the selected alternative and the depth of the subject at the smaller depth, or a range of depths between the depth corresponding to the selected alternative and the depth smaller by the predetermined amount. Thus, the user can intuitively set the depth of the graphic at a depth between the depth corresponding to the selected alternative and the depth of the subject at the smaller depth, or the depth smaller by the predetermined amount.

In the fourth aspect, according to an eighth aspect of the present invention, the user interface control device may further comprise: a shift amount obtaining unit configured to obtain a shift amount by calculating a disparity to produce a stereoscopic effect for the determined depth of the graphic and converting the disparity into a pixel number; and an image composing unit configured to compose the graphic with the one viewpoint image in the area specified by the planar position specifying unit, and to compose the graphic with the other viewpoint image included in the two viewpoint images, in an area that corresponds to the area specified by the planar position specifying unit shifted in a horizontal pixel direction by the obtained shift amount.

According to the configuration relating to the eighth aspect of the present invention, it is possible to create a stereoscopic image with the graphic composed at the determined depth.

In the first aspect, according to a ninth aspect of the present invention, the viewpoint image depth acquiring unit may acquire the depth of the subject by stereo matching of the one viewpoint image and the other viewpoint image included in the two viewpoint images.

According to the configuration relating to the ninth aspect of the present invention, even a stereoscopic image for which depth information has not been prepared in advance, for example as a depth map, can also be a target for processing.

In the first aspect, according to a tenth aspect of the present invention, the user interface control device may further comprise: a region partitioning unit configured to partition the one viewpoint image into a plurality of regions, each two adjacent of the partitioned regions differing in depth from each other by greater than a threshold value when shown in stereoscopic display; a region presenting unit configured to present the partitioned regions; and a region receiving unit configured to receive a selection of one of the presented partitioned regions, wherein the planar position specifying unit may specify the area occupied by the graphic in the one viewpoint image to include at least a part of the selected partitioned region.

According to the configuration relating to the tenth aspect of the present invention, by presenting the user with the partitioned regions for each depth in the one viewpoint image in planar display form, the user is able to easily set a planar position for the graphic. For example, even when an image has a plurality of subjects positioned within close proximity of each other, by selecting an area to be occupied by the graphic in terms of regions it is easy for the user to indicate which of the subjects to overlap the graphic on.

In the tenth aspect, according to an eleventh aspect of the present invention, the region presenting unit may present the partitioned regions each displayed in a different color from adjacent regions.

In the tenth aspect, according to a twelfth aspect of the present invention, the region presenting unit may present each of the partitioned regions with different text composed thereon.

According to the configurations relating to the eleventh or twelfth aspects of the present invention, partitioned regions in the viewpoint image with differing depths can be more easily visually distinguished.

In the tenth aspect, according to a thirteenth aspect of the present invention, the region partitioning unit may partition the one viewpoint image by (i) specifying a border of each of the regions by extracting edges and points of intersection of edges where a sharp change in brightness between adjacent pixels of the one viewpoint image occurs, and (ii) using a depth of each pixel in the one viewpoint image, acquired by stereo matching of the one viewpoint image and the other viewpoint image, to determine whether each two of the adjacent regions differ in depth by greater than the threshold value when shown in stereoscopic display.

According to the configuration relating to the thirteenth aspect of the present invention, for viewpoint images wherein a plurality of subjects overlap, by using edges that occur at boundaries between subjects as boundaries of partitioned regions, it is possible for the user to indicate which of the subjects to overlap the graphic on through selection of one of the regions.

Embodiments of one aspect of the present invention, a user interface control device, are explained below with reference to the drawings.

(First Embodiment)

FIG. 1 shows the hardware configuration of a smart phone which has a function of a user interface control device relating to a first embodiment of the present invention. The smart phone shown in FIG. 1 includes a camera 10, a speaker 20, a GPS 30, a sensor 40, a touch panel 50, a microphone 60, a recording medium 70, a processing unit 100, and a display 200.

The camera 10 is a stereoscopic camera that captures a stereoscopic image formed from two viewpoint images. The captured stereoscopic image is recorded on the recording medium 70.

The recording medium 70 is a readable and writable non-volatile recording medium contained internally within the smart phone, and may be realized for example by a hard disk or a semiconductor memory.

The processing unit 100 has a memory, such as a RAM, and a processor, such as a CPU, and through execution of programs recorded on the recording medium 70 by the CPU, the processing unit 100 controls functions such as telephone calls or capture and processing of stereoscopic images. The function of the user interface control device relating to the present embodiment is also realized through execution by the processing unit 100 of a program recorded on the recording medium 70.

Figure 2:
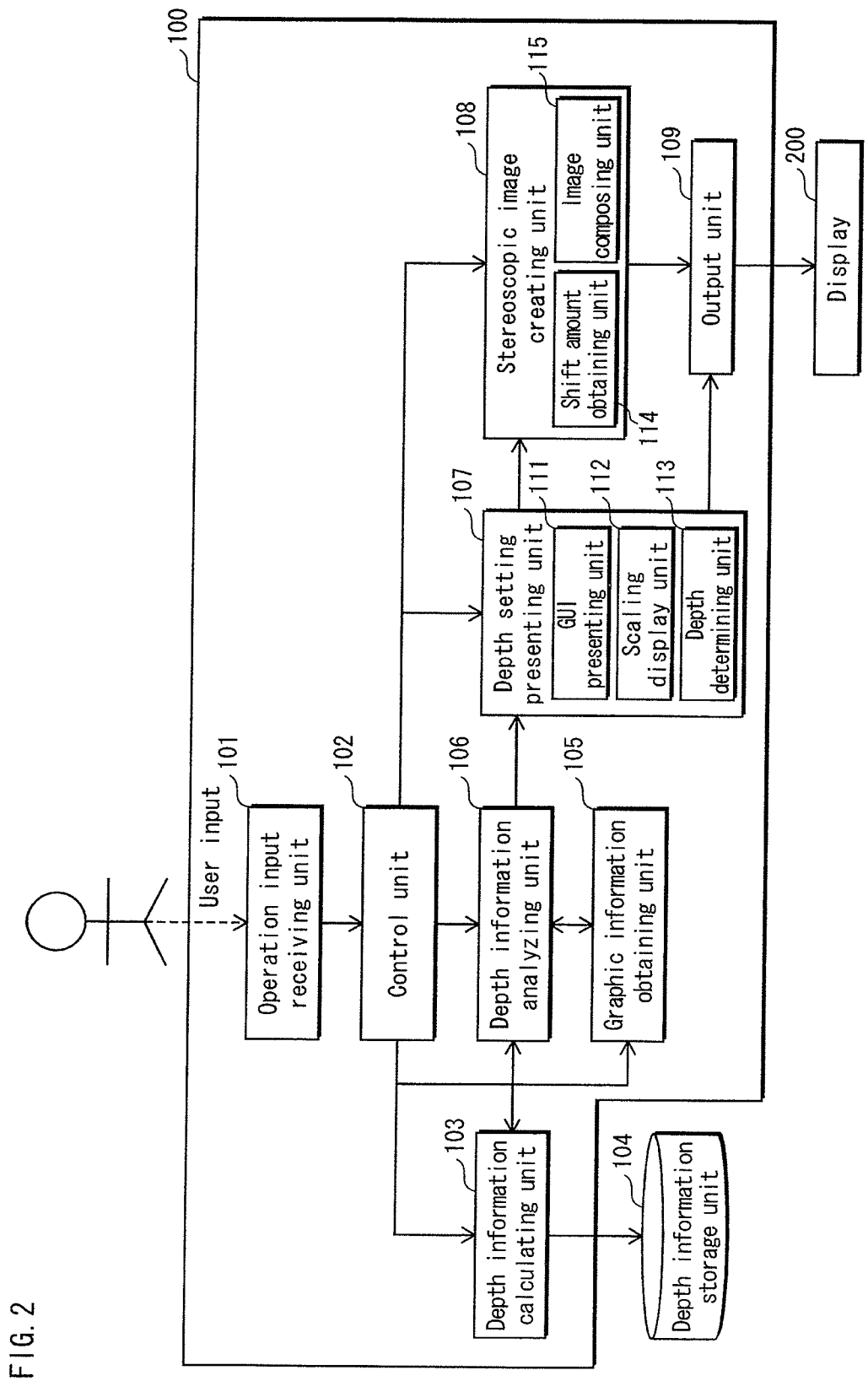
FIG. 2 is a block diagram showing the configuration of a user interface control device relating to the first embodiment.

FIG. 2 shows the configuration of the user interface control device relating to the first embodiment. The user interface control device provides a GUI which supports a user in processing a stereoscopic image. The user interface control device may, in addition to smart phones, be included and used within various other electronic devices, for example general computers such as Personal Computers (PCs) and portable communication terminals such as PDAs, tablets and cellular telephones.

As shown in FIG. 2, the user interface control device includes an operation input receiving unit 101, a control unit 102, a depth information calculating unit 103, a graphic information obtaining unit 105, a depth information analyzing unit 106, a depth setting presenting unit 107, a stereoscopic image creating unit 108, and an output unit 109.

Functions recited below of the operation input receiving unit 101, the control unit 102, the depth information calculating unit 103, the graphic information obtaining unit 105, the depth information analyzing unit 106, the stereoscopic image creating unit 108, and the output unit 109, may for example be recorded in advance as programs on the recording medium 70 shown in FIG. 1. In the present embodiment programs corresponding to each of the operation input receiving unit 101, the control unit 102, the depth information calculating unit 103, the graphic information obtaining unit 105, the depth information analyzing unit 106, the depth setting presenting unit 107, the stereoscopic image creating unit 108, and the output unit 109 are loaded to the RAM in the processing unit 100 and executed by the CPU in the processing unit 100. Thus, functions of configuration elements listed above are realized by the hardware resources (by coactions of the CPU and programs in the RAM).

The example above was explained for a configuration in which the programs are recorded on the recording medium 70 in advance, then loaded to the RAM in the processing unit 100 and executed by the CPU in the processing unit 100. However, the programs listed above may alternatively be recorded on the RAM in the processing unit 100 in advance. If the programs are recorded on the RAM in the processing unit 100 in advance, it may no longer be necessary for the programs to be recorded on the recording medium 70.

A depth information storage unit 104 is realized as a part of a recording region of the recording medium 70.

<Operation Input Receiving Unit 101>

The operation input receiving unit 101 is configured to receive operations input by a user via means of a pointing device such as a touch panel or a mouse.

The operation input receiving unit 101 is configured to receive user operations in the present embodiment such as a drag operation for positioning graphics used to retouch a photograph, a click operation for selecting an item or state indicated by the pointing device, or a click operation for selecting one of a plurality of alternatives displayed on a screen. Thus, the operation input receiving unit 101 realizes the function of the receiving unit.

Figure 4:
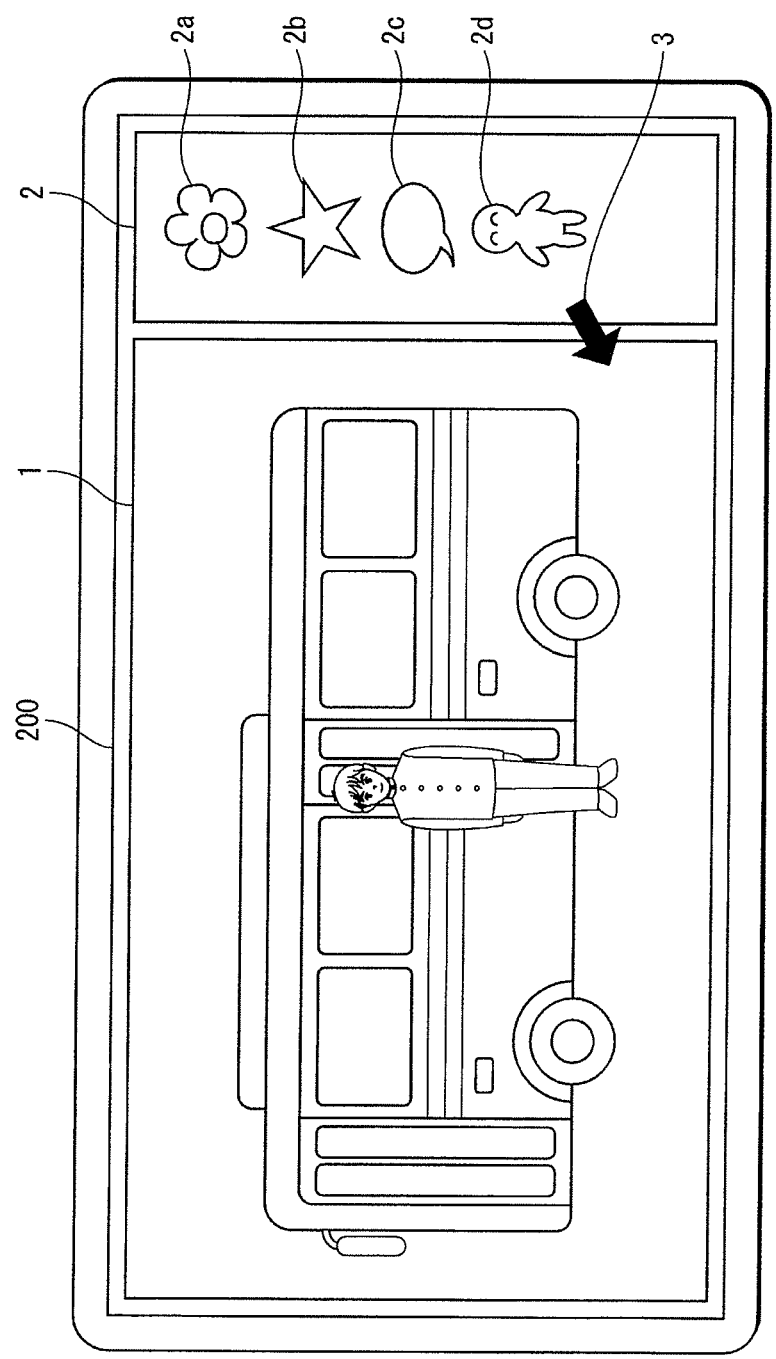
FIG. 4 shows a display example of a display 200.

FIG. 4 shows the display 200 displaying: a left-viewpoint image 1, which is one of two viewpoint images forming a stereoscopic image; a graphic parts display section 2, which displays template images for graphic parts 2a-2d corresponding to various graphics that can be composed with the stereoscopic image; and a pointer 3, which shows an indicating position of the pointing device. For example, an operation for arranging a graphic part on a photograph is realized by dragging one of the graphic parts 2a-2d displayed in the graphic parts display section 2, and dropping the graphic part at an arbitrary position on the left-viewpoint image 1.

<Control Unit 102>

The control unit 102 is configured to control processing in the present embodiment in accordance with inputs received by the operation input receiving unit 101.

<Depth Information Calculating Unit 103>

The depth information calculating unit 103 is configured to create depth information (a depth map) showing depths of subjects in the stereoscopic image for each pixel of the left-viewpoint image, thus realizing part of the function of the viewpoint image depth acquiring unit recited in the first aspect of the present invention. Specifically, the depth information calculating unit 103 first searches for corresponding points for each pixel in the left-viewpoint image and a right-viewpoint image, which form the stereoscopic image. The depth of each subject is calculated by triangulation using a positional relationship between corresponding points in the left-viewpoint image and the right-viewpoint image. The depth information is in the form of a grayscale image showing a depth of each pixel as an 8-bit brightness. The depth information calculating unit 103 converts the calculated depth of the subject to a value of from 0 to 255 on a 256 value scale. Any appropriate method may be used for searching for corresponding points. Two main types of method are region base-matching, wherein small regions are created around focal points and then region base-matching is performed based on shading patterns of pixel values within the regions, and feature base-matching, wherein features such as edges are extracted from an image and then matched with corresponding features. A stereoscopic image is formed from images acquired by capture of a viewing field from different viewpoints. In the first embodiment image data of a stereoscopic image captured by the camera 10 and recorded on the recording medium 70 is used. However, the stereoscopic image is not limited to real-life picture images, and may instead be CG (Computer Graphics) created by imagining differing virtual viewpoints.

Figure 3:
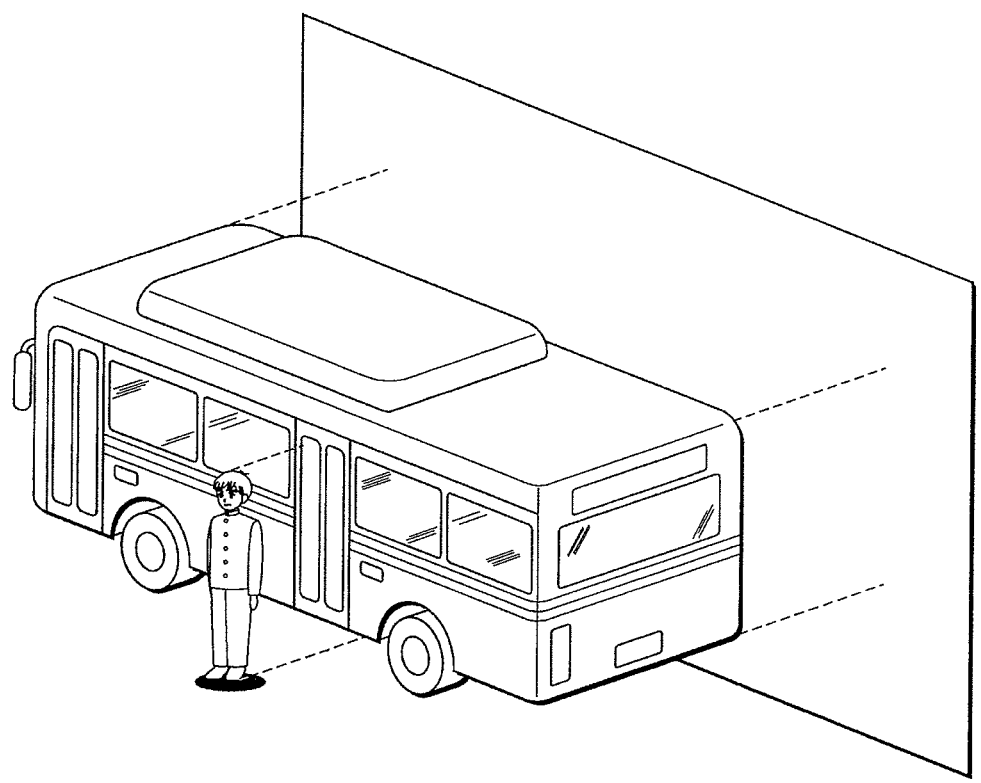
FIG. 3 shows two subjects of a stereoscopic image which is a target for processing in the first embodiment.

The present embodiment is explained for processing of a stereoscopic image, captured by a stereoscopic camera, of a scene where a person is standing in front of a bus as shown in FIG. 3.

<Depth Information Storage Unit 104>

The Depth information storage unit 104, which is realized as a part of the recording region of the recording medium 70, is configured to store depth information calculated by the depth information calculating unit 103 in the recording region of the recording medium 70.

<Graphic Information Obtaining Unit 105>

The graphic information obtaining unit 105 is configured to obtain coordinates of an area in the left-viewpoint image occupied by the graphic positioned by the user. Thus, the graphic information obtaining unit 105 realizes the function of the planar position specifying unit.

Figure 5:
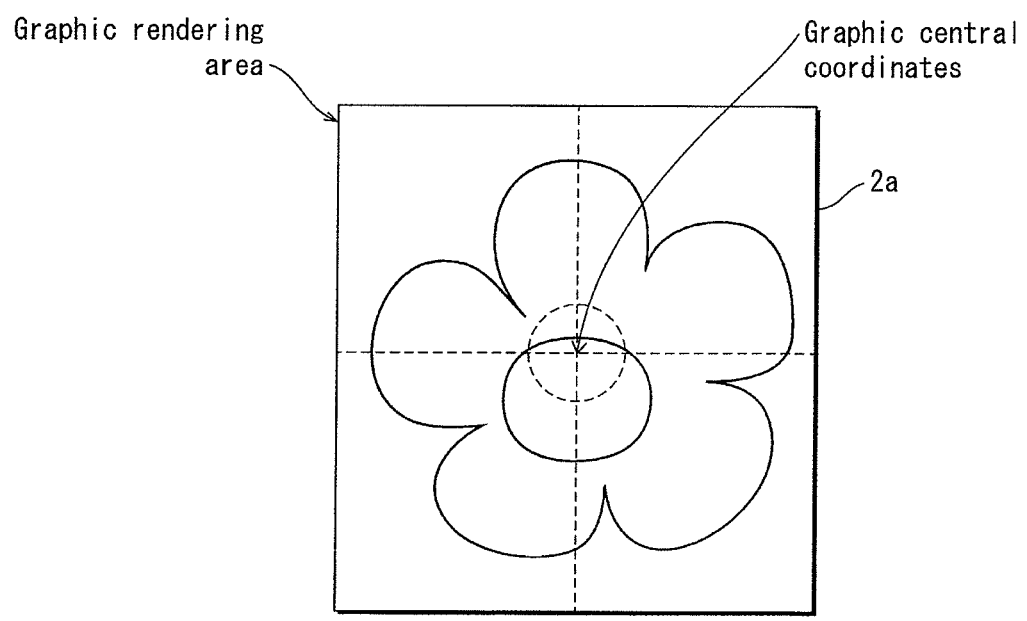
FIG. 5 shows a rendering area and central coordinates of a graphic.

More specifically, when a graphic positioning operation is received by the operation input receiving unit 101, the graphic information obtaining unit 105, at a time of dropping the graphic, obtains a planar position indicated by the pointer. The planar position is in an X-Y coordinate system of the left-viewpoint image, wherein a top left corner of the left-viewpoint image is the origin. The graphic information obtaining unit 105 uses the obtained planar position as central coordinates $(x_g, y_g)$ for positioning the graphic part. The graphic information obtaining unit 105 calculates an area occupied by the graphic part in the X-Y coordinate system by using coordinates of a top left corner $(x_1, y_1)$ and a bottom right corner $(x_2, y_2)$ of a rectangle surrounding the graphic part as shown in FIG. 5.

Furthermore, the graphic information obtaining unit 105 retains relative values of coordinates of a central point, a top left corner and a bottom right corner of each of the graphic parts. By using the relative values and the coordinates indicated by the pointer to calculate the top left corner coordinate $(x_1, y_1)$ and the bottom right corner coordinate $(x_2, y_2)$, the graphic information obtaining unit 105 can easily obtain the area occupied by the graphic part.

<Depth Information Analyzing Unit 106>

The depth information analyzing unit 106 is configured to obtain depth information for the left-viewpoint image within the area occupied by the graphic part. The depth information analyzing unit 106 also instructs the depth setting presenting unit 107 to present the user with alternatives for possible depths at which to position the graphic part in terms of positions relative to the subjects in the left-viewpoint image.

More specifically, the depth information analyzing unit 106 reads from the recording medium 70 through the depth information storage unit 104 the depth information of the left-viewpoint image within the area occupied by the graphic part calculated by the graphic information obtaining unit 105. The depth information analyzing unit 106 then detects subjects appearing within the area occupied by the graphic part by analyzing the depth information and determines possible depths at which to position the graphic, relative to the detected subjects. Thus the depth analyzing unit realizes the function of the viewpoint image depth acquiring unit.

In order to detect subjects, the depth information analyzing unit 106 first analyzes the depth distribution of the left-viewpoint image within the area occupied by the graphic part along a horizontal sequence of pixels (referred to below as a horizontal pixel group) passing through the central coordinates $(x_g, y_g)$ of the graphic part. When a difference in depth between two adjacent pixels in the horizontal pixel group exceeds a threshold value Th, two different subjects are determined to be present at the position where the difference in depths exceeds the threshold value Th. When a subject is determined to be present within the area occupied by the graphic part, the depth information analyzing unit 106 determines that possible depths for the graphic part are: at a smaller depth than a smallest depth between coordinates $(x_1, y_g)$ and $(x_2, y_g)$; at a depth equal to the smallest depth; or at a depth equal to an average of the depths of the two adjacent pixels with depths differing by more than the threshold value Th. The depth information analyzing unit 106 instructs the depth setting presenting unit 107 to present alternatives corresponding to each of the possible depths.

For example, consider a situation in which the graphic part is arranged so that a section of the graphic part overlaps with a position corresponding to a head of the person, who is one of the subjects in the image. In the above situation possible depths for the graphic part may be thought to be: as in FIG. 6A at a smaller depth 4a than the depth of the person; as in FIG. 6B at an equal depth 4b to the depth of the person; or as in FIG. 6C at an intermediate depth 4c between the depth of the person and the depth of the bus.

Figure 6A:
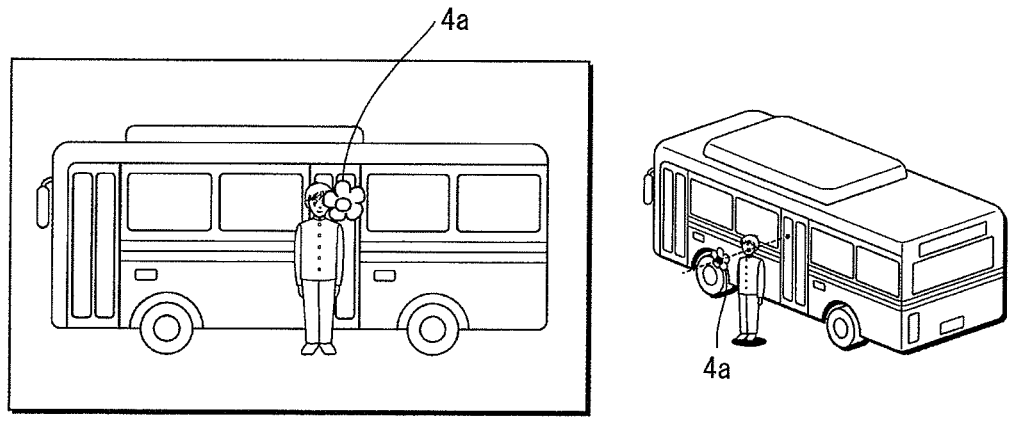
FIG. 6A shows an example where a depth of a graphic part is set at a smaller depth than the two subjects.
Figure 6B:
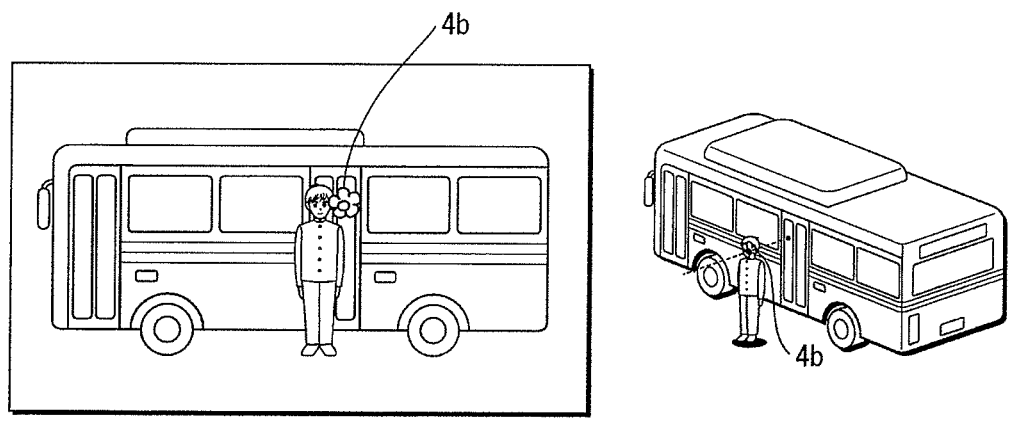
FIG. 6B shows an example where the depth of the graphic part is set at an equal depth to a subject of smallest depth from among the two subjects.
Figure 6C:
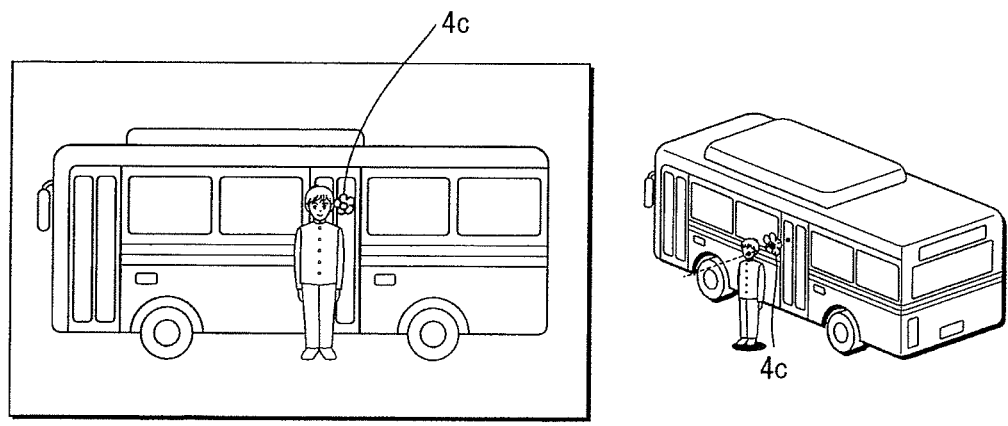
FIG. 6C shows an example where the depth of the graphic part is set at a depth intermediate between the two subjects.
Figure 7:
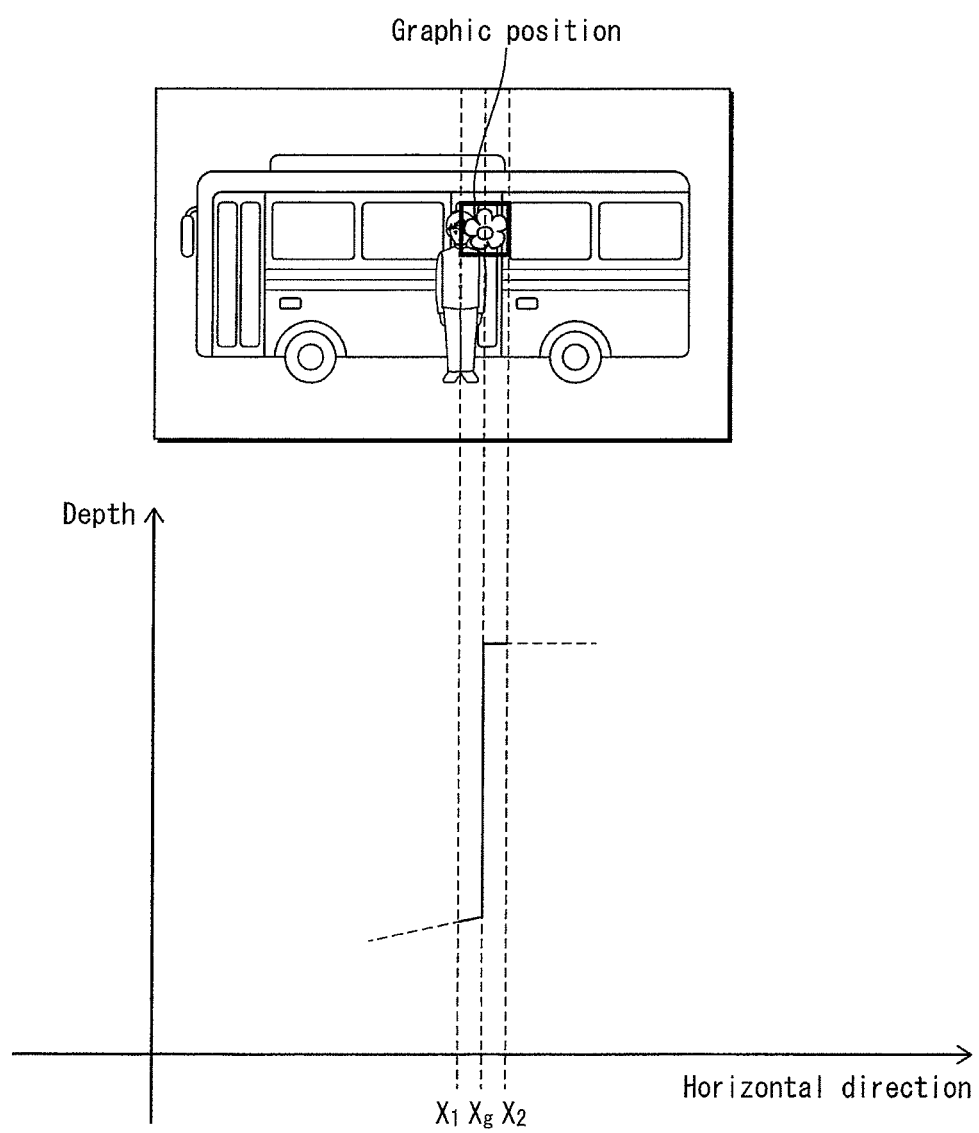
FIG. 7 shows a depth distribution of a viewpoint image at a planar position of the graphic part.

As shown in FIG. 7, due to a difference in depth exceeding the threshold value Th at a boundary between the person and the bus in the left-viewpoint image, the depth information analyzing unit 106 determines that two subjects are present within the area occupied by the graphic part. The depth information analyzing unit 106 determines three possible depths for the graphic part, wherein the depth 4a in FIG. 6A is set as a smaller depth than the person in the foreground at point $x_1$, the depth 4b in FIG. 6B is set as an equal depth to the person in the foreground at point $x_1$, and the depth 4c in FIG. 6C is set as an average depth of the person in the foreground at point $x_1$ and the bus in the background at point $x_2$.

Furthermore, when the depth information analyzing unit 106 detects three or more subjects within the area occupied by the graphic part, the depth information analyzing unit 106 for each two adjacent subjects in terms of depth, sets a depth intermediate between the two adjacent subjects as a possible depth for the graphic part and instructs the depth setting presenting unit 107 to display an alternative corresponding to the depth intermediate between the two adjacent subjects.

In the left-viewpoint image displayed on the display 200, when the graphic part is arranged so that the whole of the graphic part overlaps with an area occupied by one of the subjects, if the graphic part is positioned at a greater depth than the subject, the graphic part will not appear in the image and is redundant. Therefore, there are only two possible depths for positioning the graphic part relative to the subject: at the same depth as the subject, or at a smaller depth than the subject. In the above situation the depth information analyzing unit 106 instructs the depth setting presenting unit 107 to present alternatives corresponding to the two possible depths for positioning the graphic part.

<Depth Setting Presenting Unit 107>

The depth setting presenting unit 107 includes a GUI presenting unit 111, a scaling display unit 112 and a depth determining unit 113, and is configured to determine the depth for positioning the graphic part by controlling a GUI used to set the depth of the graphic part.

The GUI presenting unit 111 realizes the function of the presenting unit. The GUI presenting unit 111 is configured to receive an instruction from the depth information analyzing unit 106, create a GUI image containing alternatives given in the instruction, and notify the output unit 109 to render the GUI image as a pop-up menu. In the example shown in FIG. 8, in the displayed left-viewpoint image the head of the person in the foreground and the bus in the background are within an area occupied by a flower shaped graphic. The depth setting presenting unit 107 is instructed by the depth information analyzing unit 106 to present alternatives for the depth of the graphic part as "In front", "Pasted on" and "Behind" relative to a subject of smallest depth, which in the example is the person. Based on the instruction the depth setting presenting unit 107 creates a GUI image for a pop-up menu with the three alternatives of "In front", "Pasted on", and "Behind". For a menu like in the example, when an operation selecting the alternative of "In front" is received, the depth of the graphic part is set as a depth that is a predetermined amount smaller than a smallest depth within the area occupied by the graphic part in the left-viewpoint image. When the alternative of "Pasted on" (an equal depth to the subject of smallest depth) is selected from the menu, the graphic part is positioned at an equal depth to the smallest depth within the area occupied by the graphic part in the left-viewpoint image in order that the graphic part does not disappear behind the subject of smallest depth. When the alternative of "Behind" is selected from the menu, the graphic part is positioned at a depth intermediate between the two subjects that appear within the area occupied by the graphic part in the left-viewpoint image. In other words, the graphic part is positioned at a depth between the head of the person in the foreground and the bus in the background.

Figure 9:
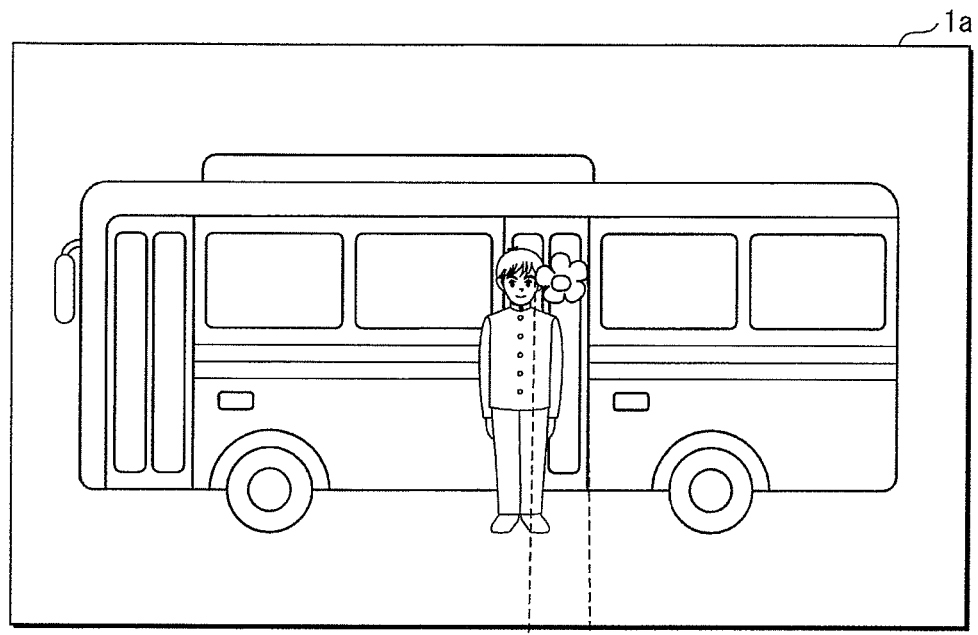
FIG. 9 explains a depth adjustment of the graphic part after a selection from the depth setting menu.
Figure 9:
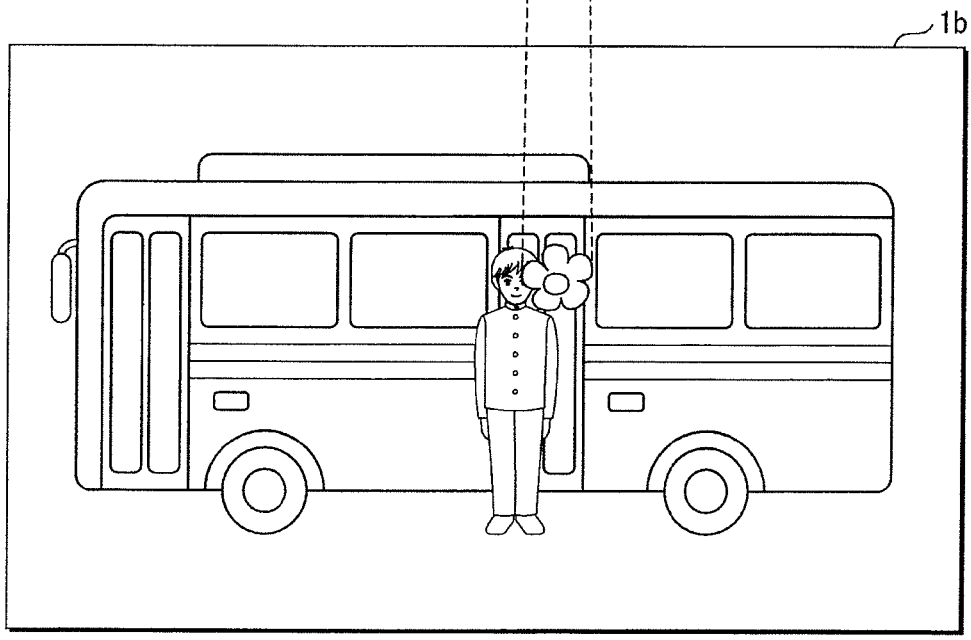

The scaling display unit 112 is configured to, when the user selects any one of the alternatives from the menu, instruct the output unit 109 to render the graphic part arranged on the left-viewpoint image shown on the display 200 as shown in FIG. 9, whereupon a display size of the graphic part is changed in a repeated cycle of enlargement and reduction until a determining click operation is input by the user. In the scaling display of the graphic part, the graphic part is enlarged and reduced from the central coordinates of the graphic part $(x_g, y_g)$ in a cycle of display sizes ranging from 50% to 200% of an original size of the graphic part in the graphic part display section 2.

The depth determining unit 113 is configured to set a depth corresponding to the selected alternative as a provisional depth for positioning the graphic part. When the user inputs a determining operation during repeated cyclic scaling of the display size of the graphic part, the depth determining unit 113 adjusts the provisional depth to determine a final depth for positioning the graphic based on the display size of the graphic part at the time of reception of the determining operation. Thus, the depth determining unit 113 realizes the function of the depth determining unit.

A correspondence is set between the display size of the graphic part and the depth of the graphic part so that: when the display size of the graphic part is equal to the original size of the graphic part, the depth of the graphic part is equal to the depth corresponding to the alternative selected from the menu; when the display size of the graphic part is 200% of the original size of the graphic part, the depth of the graphic is equal to a depth of a subject at a smaller depth than the depth corresponding to the selected alternative; and when the display size of the graphic part is 50% of the original size of the graphic part, the depth of the graphic is equal to a depth of a subject at a greater depth than the depth corresponding to the selected alternative. The depth determining unit 113 calculates the final depth of the graphic based on the correspondence between the display size and the depth of the graphic by using an enlargement/reduction ratio of the graphic part at the time of reception of the determining operation.

When the alternative of "In front" is selected from the menu there is no subject at a smaller depth than the depth corresponding to the selected alternative, therefore the scaling display unit 112 repeatedly changes the display size of the graphic part only in a range of display sizes between the original size and 50% of the original size. Also, when the alternative of "Pasted on" is selected from the menu, at greater depths than the depth corresponding to the selected alternative, the graphic part disappears behind a subject corresponding to the selected alternative, therefore the scaling display unit 112 changes the display size of the graphic part repeatedly only in a range of display sizes between the original size and 200% of the original size.

Alternatively, even when the alternative of "In front" is selected from the menu, the display size of the graphic part may be changed repeatedly in a range of display sizes between 50% and 200% of the original size. In the above case, the depth determining unit 113 sets a depth smaller by a predetermined amount than the depth corresponding to the selected alternative as the depth of the graphic part when the display size of the graphic part is 200% of the original size and calculates the depth of the graphic part using the enlargement/reduction ratio at the time of reception of the determining operation.

By repeatedly changing the display size of the graphic part, and by setting a correspondence between the display size and the depth of the graphic part, it is possible for the user to intuitively set the depth at which to position the graphic part.

<Stereoscopic Image Creating Unit 108>

The stereoscopic image creating unit 108 includes a shift amount obtaining unit 114 and an image composing unit 115. The stereoscopic image creating unit 108 is configured to compose the graphic part with the photograph, based on the depth for positioning the graphic part determined by the depth setting presentation unit 107, by using a disparity to create a left-viewpoint image and a right-viewpoint image with the graphic part composed therein.

The shift amount obtaining unit 114 is configured to obtain a shift amount by calculating a disparity required to give a stereoscopic effect for the depth of the graphic part, and converting the calculated disparity into a pixel number. Thus, the shift amount obtaining unit 114 realizes the function of the shift amount obtaining unit.

The image composing unit 115 is configured to create a stereoscopic image with the graphic part composed therein by composing the graphic part with the left-viewpoint image in the area occupied by the graphic part in the left-viewpoint image, and composing the graphic part with the right-viewpoint image in an area corresponding to the area occupied by the graphic part in the left-viewpoint image shifted in a horizontal pixel direction by the shift amount calculated by the shift amount obtaining unit 114. Thus, the image composing unit 115 realizes the function of the image composing unit.

<Output Unit 109>

The output unit 109 is a driver that controls display of the display 200, and is configured to display images such as the left-viewpoint image, the GUI image instructed by the depth setting presenting unit 107, and the graphic part during processing, or the stereoscopic image with the graphic part composed therein created by the stereoscopic image creating unit 108.

The above describes the configuration of the user interface control device.

<Operation>

The operation of the user interface control device with the above configuration is described below.

<Depth Information Creation Procedure>

Figure 10:
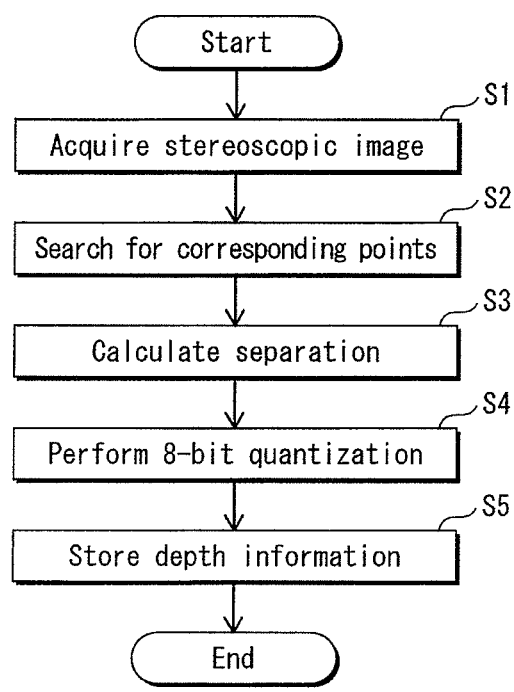
FIG. 10 is a flowchart showing a depth information creation procedure that is performed by a depth information calculating unit 103.

A depth information creation procedure performed by the depth information calculating unit 103 is described below. FIG. 10 is a flowchart showing the depth information creation procedure.

As shown in FIG. 10, first the depth information calculating unit 103 acquires a left-viewpoint image and a right-viewpoint image (Step S1). The depth information calculating unit 103 then searches for pixels in the right-viewpoint image corresponding to pixels in the left-viewpoint image (Step S2). Next, the depth information unit calculating unit 103 calculates subject depths from the corresponding points in the left-viewpoint image and the right-viewpoint image using triangulation (Step S3). Step S2 and Step S3 form a stereo matching procedure which is performed for all of the pixels in the left-viewpoint image. When the stereo matching procedure, performed for all of the pixels in the left-viewpoint image, in Step S2 and Step S3 is complete, the depth information calculating unit 103 converts the information concerning the subject depths calculated in Step S3 using 8 bit quantization (Step S4). More specifically, the depth information calculating unit 103 converts each subject depth into a value from 0 to 255 on a 256 value scale, and creates a grayscale image wherein a depth of each pixel is shown as an 8-bit brightness. The created grayscale image is recorded in the depth information storage unit 104 as depth information.

The above describes the depth information creation procedure performed by the depth information calculating unit 103.

<Depth Setting Pop-Up Menu Display Procedure>

Figure 11:
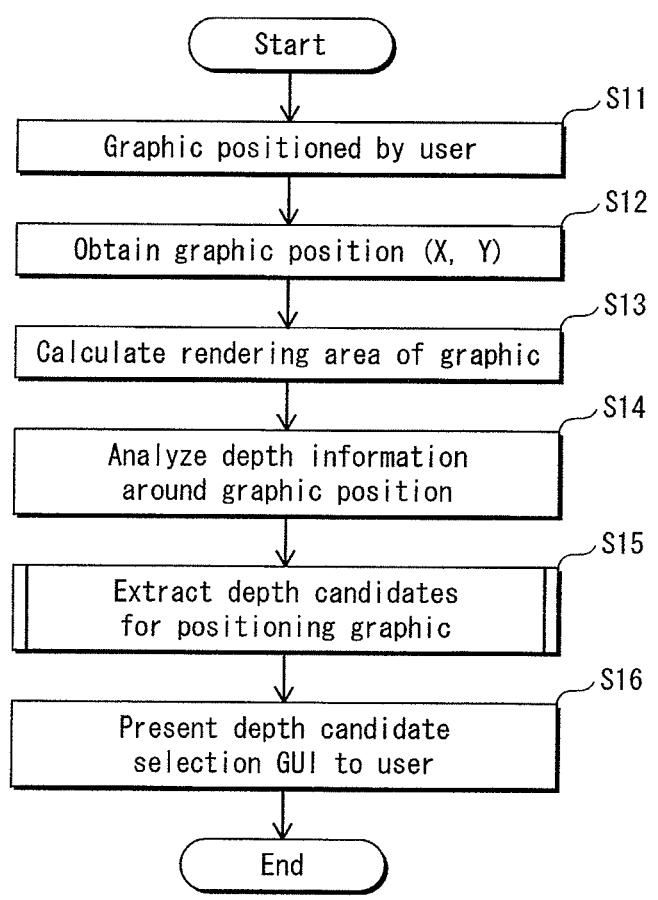
FIG. 11 shows a display procedure for the depth setting pop-up-menu.

FIG. 11 is a flow chart showing a depth setting pop-up menu display procedure which is executed in response to a graphic part positioning operation by the user.

In the depth setting pop-up menu display procedure, when the operation input receiving unit 101 receives the graphic part positioning operation (Step S11), the graphic information obtaining unit 105 obtains a set of coordinates for a planar position of the graphic part in the left-viewpoint image (Step S12), and calculates an area occupied by the graphic part using the set of coordinates as a central point (Step S13). As shown in FIG. 5, the area of the graphic part is calculated using coordinates of a top left corner and a bottom right corner of a rectangular region that surrounds the graphic part.

After the coordinates of the area of the graphic part have been calculated, the depth information analyzing unit 106 reads depth information from the depth information storage unit 104 for a horizontal pixel group passing through the central coordinates ($x_g$, $y_g$) of the area of the graphic part (Step S14). Based on the depth information, the depth information analyzing unit 106 performs a graphic part depth candidate extraction procedure for extracting possible depth candidates for positioning the graphic part (Step S15).

In the graphic part depth candidate extraction procedure in Step S15, as detailed below with reference to FIG. 12, L different alternatives corresponding to the depth candidates for the graphic part are determined, and depths of each of L−1 different subjects appearing within the area of the graphic part are recorded on the recording medium 70. Based on a result of the graphic part depth candidate extraction procedure in Step S15, the GUI presenting unit 111 creates a pop-up menu including the L different determined alternatives, and presents the menu to the user (Step S16).

In the pop-up menu created by the GUI presenting unit 111 the L different alternatives are set to correspond to different depths as follows. First the alternative of "Pasted on" is set to correspond to a depth of a subject of smallest depth among the subject depths recorded on the recording medium 70 during the graphic part depth candidate extraction procedure. The alternative of "In front" is set to correspond to a depth that is a predetermined amount smaller than the depth corresponding to the alternative of "Pasted on". Finally, for the L−1 different subject depths recorded on the recording medium 70, starting from the subject of smallest depth an average depth of each two adjacent subjects in terms of depth is calculated, and the calculated average depths are set to correspond to alternatives of "Behind 1", "Behind 2" and so on up to "Behind L−2".

Figure 8:
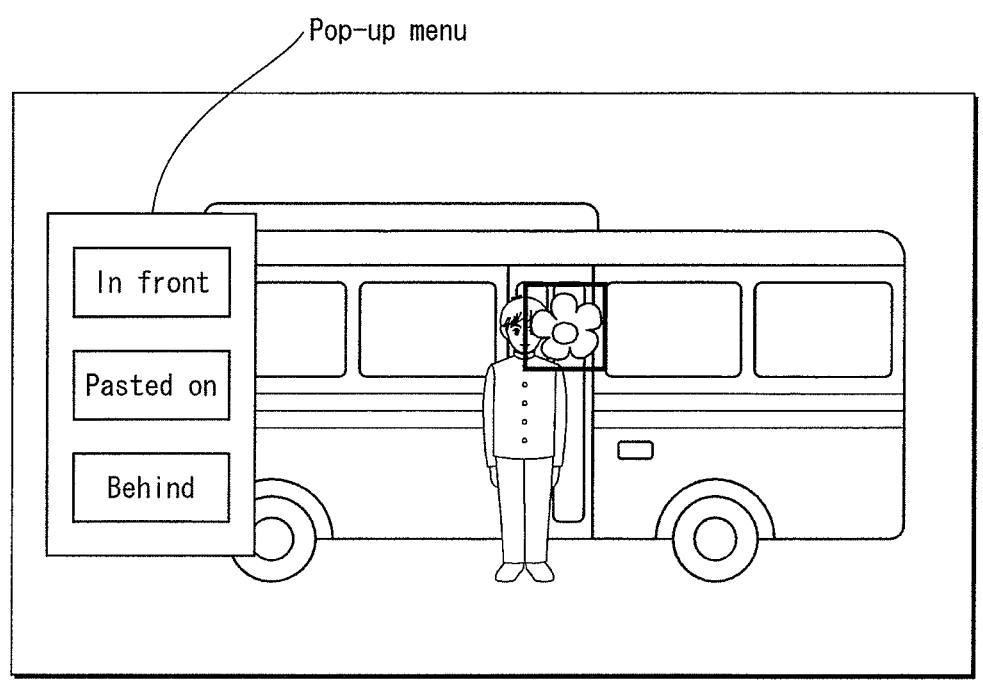
FIG. 8 shows a display example of a depth setting pop-up menu with a plurality of alternatives.

A default display position for the pop-up menu is the top left corner of the left-viewpoint image as shown in FIG. 8, however if the display position of the pop-up menu overlaps with the position of the graphic part, the pop-up menu is moved to a position where there is no overlapping with the subjects.

The above explains the depth setting pop-up menu display procedure.

<Graphic Part Depth Candidate Extraction Procedure>

Figure 12:
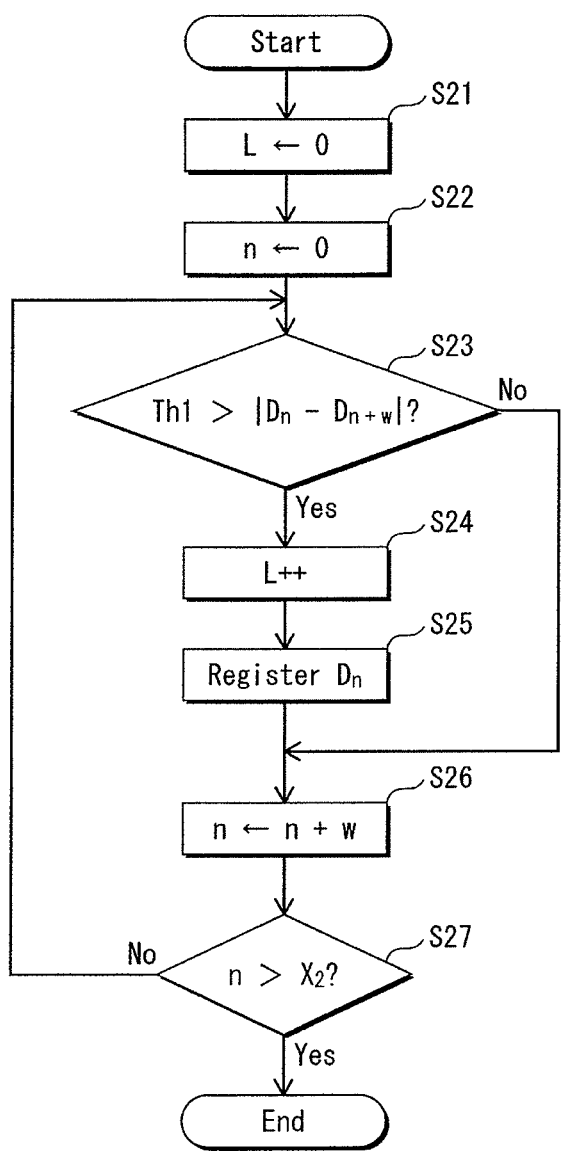
FIG. 12 is a flowchart showing a procedure for extraction of depth candidates for positioning the graphic part.

FIG. 12 is a flowchart showing in detail the procedure for extracting depth candidates for the graphic part that occurs in Step S15 of FIG. 11.

In the graphic part depth candidate extraction procedure, the depth information analyzing unit 106 initializes a variable L, that controls a number of alternatives, at a value of 2 (Step S21) and initializes a variable n, that controls search coordinates, at a value $x_1$, which corresponds to the value of the x coordinate of the top left corner of the area of the graphic part (Step S22).

After initialization of the variables L and n, the depth information analyzing unit 106 executes procedures in Step S23 to Step S27 in a loop.

In Step S23, the depth information analyzing unit 106 calculates an absolute value of a difference ($D_n - D_{n+w}$) between a depth $D_n$ of the left-viewpoint image at the coordinates (n, $y_g$) and a depth $D_{n+w}$ of the left-viewpoint image at coordinates (n+w, $y_g$) a predetermined search width (for example five pixels) to the right of the coordinates (n, $y_g$). The depth information analyzing unit 106 determines whether the difference ($D_n - D_{n+w}$) exceeds a threshold value Th. If the difference ($D_n - D_{n+w}$) exceeds the threshold value Th (Step S23: Yes), the depth information analyzing unit 106 increments the number of alternatives L (Step S24) and records the depth $D_n$ of the left-viewpoint image at the search coordinates on the recording medium 70 as a subject depth (Step S25).

When the depth $D_n$ has been recorded as corresponding to an alternative in Step S25, or when the difference ($D_n - D_{n+w}$) does not exceed the threshold value Th (Step S23: No), the depth information analyzing unit 106 updates the variable n controlling the search coordinates to a value of n+w (Step S26). The depth information analyzing unit 106 determines whether the updated variable n exceeds a value of the x coordinate $x_2$ of the bottom right corner of the area of the graphic part (Step S27).

In Step S27, when the variable n does not exceed $x_2$ the graphic part depth candidate extraction procedure is repeated in a loop from Step S23, and when the variable n exceeds $x_2$ the graphic part depth candidate extraction procedure is complete.

The predetermined search width is not limited to five pixels as described above, instead an arbitrary number of pixels appropriate for detecting subjects in an image may be used. When an image contains two people adjacent to one another at an equal depth, if a small search width w such as one pixel is used, background subjects visible through small gaps between the two people will be detected as depth candidates for the graphic part, and thus the user might be presented with alternatives during processing of the image which are redundant. Conversely, if the search width w is large, for regions where there is a gradual change from a small depth to a large depth, for example a wall captured in an image in a diagonal direction, there is a possibility that a different subject will be detected for each search width w. Therefore, when the search width w is large it is desirable that in response the threshold value Th is also large.

In the present embodiment, the depth distribution of the horizontal pixel group passing through the central coordinates $(x_g, y_g)$ of the area of the graphic part is analyzed to extract depth candidates for the graphic part. Alternatively, depth candidates for the graphic part may be extracted by analyzing depth distributions of any other horizontal pixel group within the area of the graphic part, or even any group of vertically sequential pixels within the area of the graphic part. Further alternatively, a plurality of horizontal or vertical pixel groups may also be analyzed.

The above explains the graphic part depth candidate extraction procedure performed by the depth information analyzing unit 106.

<Graphic Part Depth Adjustment Procedure>

Figure 13:
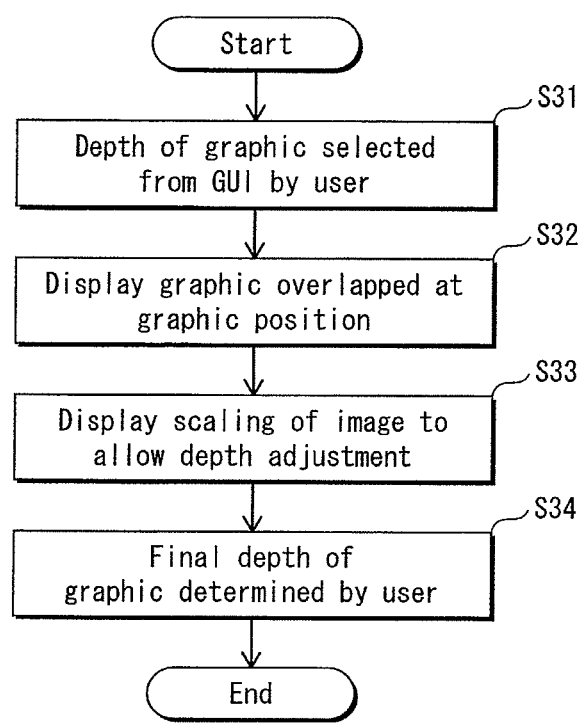
FIG. 13 is a flowchart showing a depth adjustment procedure for the graphic part after a selection from the depth setting menu.

FIG. 13 is a flowchart showing a graphic part depth adjustment procedure that is performed in response to a selection operation of one of the alternatives from the pop-up menu.

In the graphic part depth adjustment procedure, the depth determining unit 113 obtains a depth corresponding to the alternative selected by the user (Step S31).

Next, the scaling display unit 112, after overlapping display of the graphic part in the area of the graphic part (Step S32), updates the image with the display size of the graphic part cyclically enlarged and reduced from a central point having coordinates equal to the planar position of the graphic part (Step S33).

In order to allow adjustment of the depth of the graphic part a correspondence is set between the display size of the graphic part and the depth of the graphic part. In the correspondence the larger the display size of the graphic part the smaller the depth of the graphic part. When the graphic part is displayed at a desired display size the user inputs a determining operation. The depth determining unit 113 adjusts the depth corresponding to the selected alternative acquired in Step S31 in accordance with the display size of the graphic part at the time of reception of the determining operation (Step S34).

Figure 14:
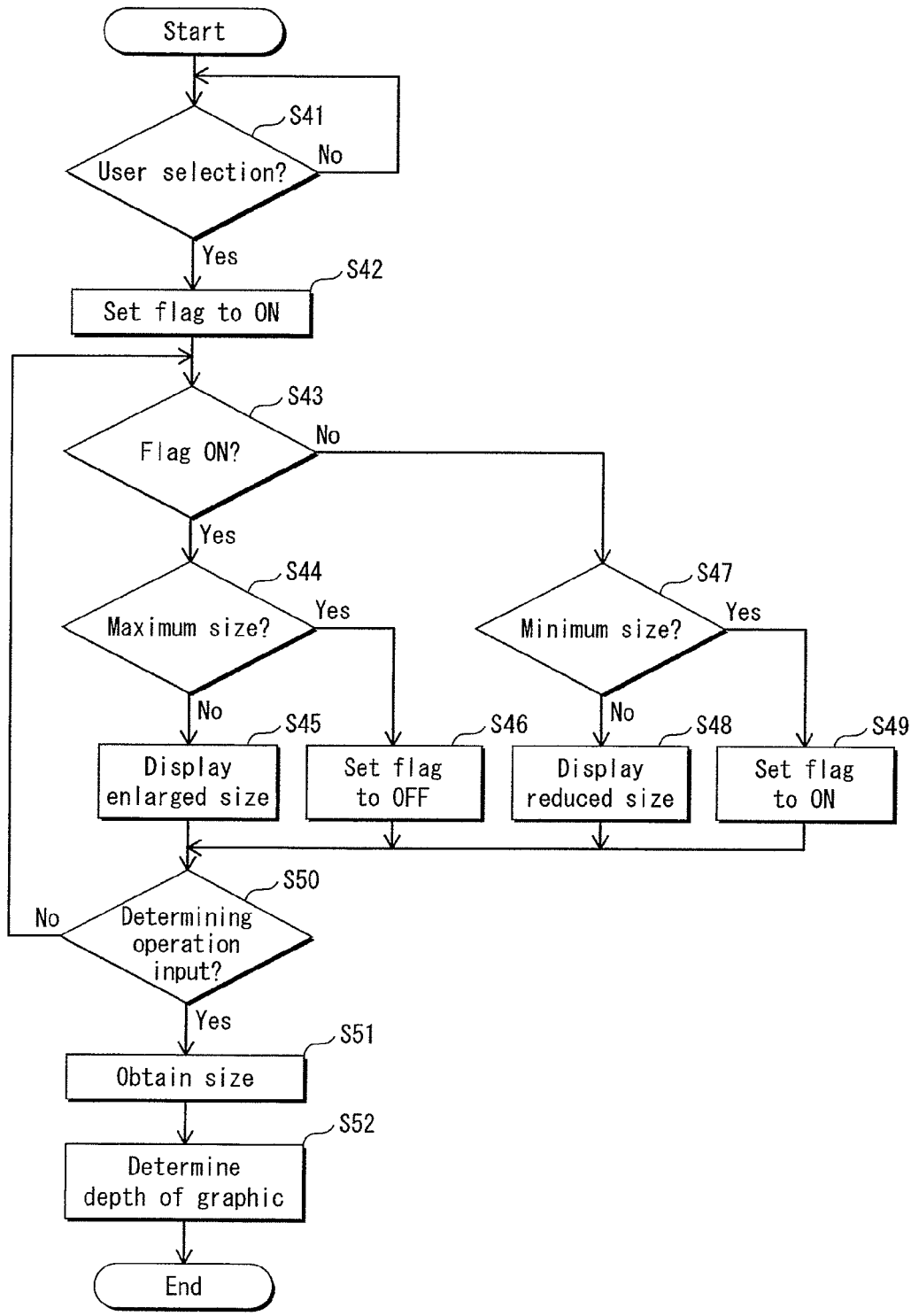
FIG. 14 shows procedures in Steps S33 and S34 in detail.

The procedures in Step S33 and Step S34 are explained in detail below with reference to the flowchart in FIG. 14.

Step S41 is a loop procedure that is performed when there is a selection operation by the user of one of the alternatives from the pop-up menu. The scaling display unit 112, upon receiving the selection operation (Step S41: Yes), initializes an enlargement flag to "ON" (Step S42). After initialization of the enlargement flag, the scaling display unit 112 repeatedly performs the loop procedure from Step S43 through to Step S50.

Step S43 is a determination of whether the enlargement flag is set to "ON". If the enlargement flag is set to "ON" (Step S43: Yes), it is determined whether the display size of the graphic part is at the maximum size (200% of the original size of the graphic part in the graphic part display section 2 in FIG. 4) (Step S44). If the display size of the graphic part is not at the maximum size (Step S44: No), a enlargement ratio of the graphic part is raised by 10% and the display size of the graphic part is updated (Step S45). If the display size of the graphic part is at the maximum size (Step S44: Yes), the enlargement flag is set to "OFF" (Step S46). After the procedures in Step S45 and Step S46 are complete, it is determined in Step S50 whether a determining operation is input by the user.

If in Step S43 the enlargement flag is set to "OFF" (Step S43: No), it is determined whether the display size of the graphic part is at the minimum size (50% of the original size) (Step S47). If the display size of the graphic part is not at the minimum size (Step S47: No), a reduction ratio of the graphic part is lowered by 5% and the display size of the graphic part is updated (Step S48). If the display size of the graphic part is at the minimum size (Step S47: Yes), the enlargement flag is set to "ON" (Step S49). After the procedures in Step S48 and Step S49 are complete, it is determined in Step S50 whether a determining operation is input by the user.

If there is determined to be no input of a determining operation by the user in Step S50 (Step S50: No), procedures are repeated from Step S43.

If there is determined to be input of a determining operation by the user in Step S50 (Step S50: Yes), the depth determining unit 113 acquires the display size of the graphic part at the time of the determining operation (Step S51), and according to the display size determines an adjusted depth of the graphic (Step S52). More specifically, if the display size of the graphic part acquired in Step S51 is enlarged in comparison to the size of the graphic part displayed in the graphic part display section 2 in FIG. 4, the depth determining unit 113 determines an adjusted depth of the graphic part that is smaller, by an amount in proportion to the enlargement ratio, than the depth corresponding to the selected alternative in Step S31 of the flowchart in FIG. 13. Conversely, if the display size of the graphic part acquired in Step S51 is reduced in comparison to the size of the graphic part displayed in the graphic part display section 2, the depth determining unit 113 determines an adjusted depth for the graphic part that is greater, by an amount in proportion to the reduction ratio, than the depth corresponding to the selected alternative in Step S31.

The above describes the graphic part depth adjustment procedure performed by the depth setting display presenting unit 107.

<Stereoscopic Image Creation Procedure>

Figure 15:
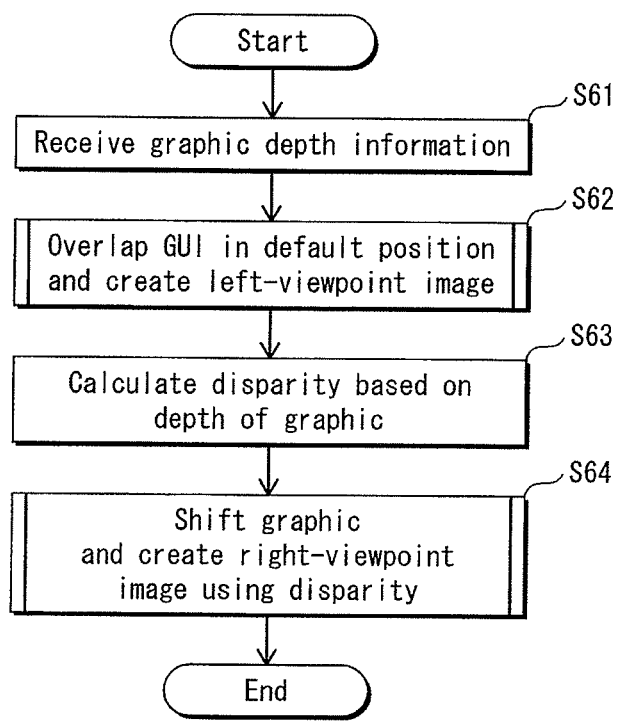
FIG. 15 is a flowchart showing a procedure for creating a composite stereoscopic image with the graphic part.

FIG. 15 is a flowchart showing a stereoscopic image creation procedure for creating a stereoscopic image with the graphic part composed thereon, based on the depth of the graphic part determined by the depth setting presenting unit 107.

First the shift amount obtaining unit 114 obtains the depth of the graphic part determined by the depth setting presenting unit 107 (Step S61). The image composing unit 115 composes the graphic part with the left-viewpoint image in the area of the graphic part in the left-viewpoint image, to create a composite left-viewpoint image (Step S62).

Next, the shift amount obtaining unit 114 calculates a pixel shift amount from the depth of the graphic part determined by the depth setting presenting unit 107 (Step S63). The composing unit 115 composes the graphic part with the right-viewpoint image in an area with coordinates corresponding to the coordinates of the area of the graphic part in the left-viewpoint image shifted by the pixel shift amount calculated in Step S63, to create a composite right-viewpoint image (Step S64).

Figure 16A:
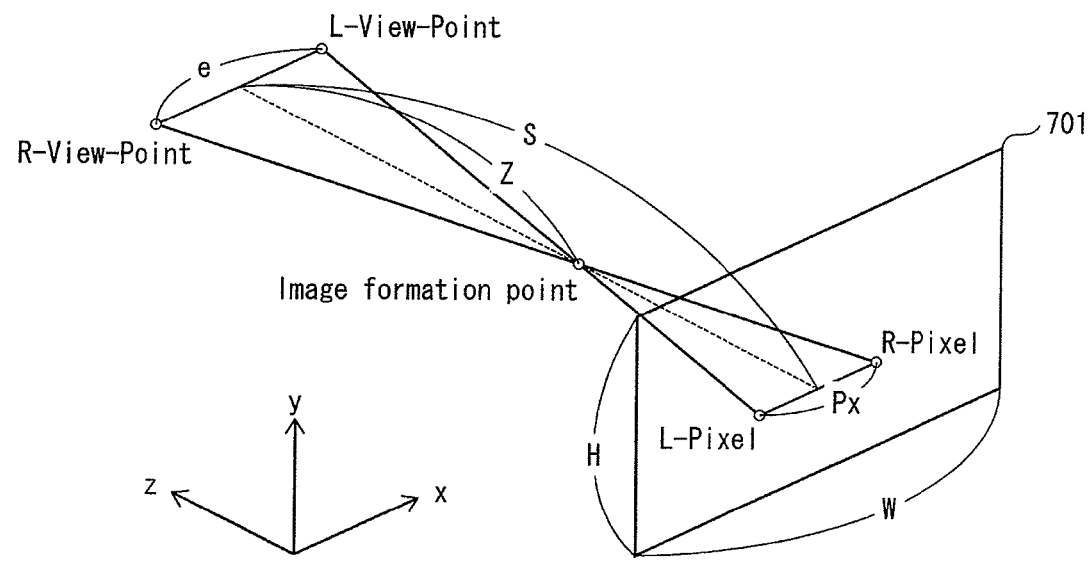
FIG. 16 shows a pixel shift used to calculate a disparity from determined depth information.
Figure 16B:
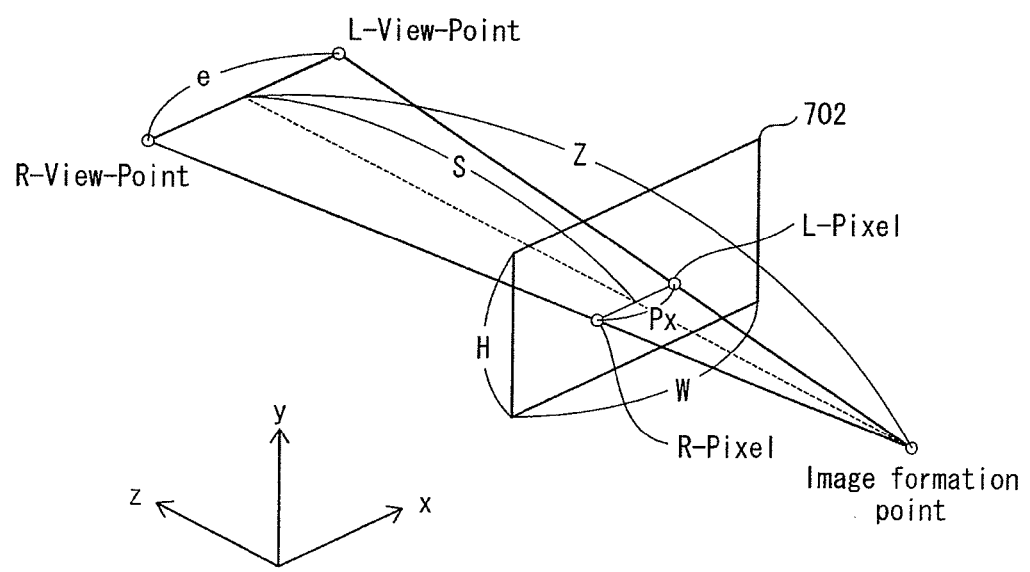

A method for calculating the pixel shift amount from the depth of the graphic part is explained below with reference to FIG. 16A and FIG. 16B. FIG. 16A and FIG. 16B each show a relationship between the depth of the graphic part and the pixel shift amount. Stereoscopic effects include a projecting effect and a retracting effect. FIG. 16A shows a pixel shift in the projecting effect and FIG. 16B shows a pixel shift in the retracting effect. In FIG. 16A and FIG. 16B Px is an amount of horizontal shift, L-View-Point is a position of a left-eye pupil, R-View-Point is a position of a right-eye pupil, L-Pixel is a left-viewpoint pixel, R-Pixel is a right-viewpoint pixel, e is a separation between the two pupils, H is a height of a display screen, W is a width of the display screen, S is a distance between a viewer and the display screen, and Z is a distance from the viewer to an image formation point which shows the depth of the graphic part. A straight line linking the left-viewpoint pixel L-Pixel and the left-eye pupil L-View-Point is a line of sight of the left-eye pupil L-View-Point. A straight line linking the right-eye pixel R-Pixel and the right-eye pupil R-View-Point is a line of sight of the right-eye pupil R-View-Point. The two differing viewpoints can be achieved through equipment such as 3D glasses switching between optical transmission and blocking, or parallax barriers using lenticular lenses or the like.

When the right-viewpoint pixel R-Pixel and the left-viewpoint pixel L-Pixel have a positional relationship on the display screen 702 as shown in FIG. 16A, a value of Px is negative. When the positional relationship on the display screen 702 is as shown in FIG. 16B, a value of Px is positive.

First consider the height H and the width W of the display screen. If the display screen is a size X inch television, where a value of X is a diagonal length across the screen in inches, then a relationship between X, the display screen height H and the display screen width W is $X^2=H^2+W^2$. Also by using an aspect ratio of m:n, the display screen height H and the display screen width W can be expressed as W:H=m:n. Based on the above relationships, the display screen height H in FIG. 16A and FIG. 16B can be expressed as in MATH 1.

$$H = \sqrt{\frac{m^2}{m^2 + n^2}} X \qquad \text{MATH 1}$$

The display screen width W can be expressed as in MATH 2.

$$W = \sqrt{\frac{n^2}{m^2 + n^2}} X \qquad \text{MATH 2}$$

Thus, the display screen height H and the display screen width W can be calculated from the size X of the television and the aspect ratio m:n. Values for the television type X and the aspect ratio m:n are obtained through a negotiation with an external display. The relationship between the display screen height H and the display screen width W is explained above. Next the amount of horizontal shift will be explained below.

First the amount of horizontal shift is explained for the projecting stereoscopic effect. The display screen 701 in FIG. 16A shows the pixel shift when the viewer executes the projecting stereoscopic effect. By performing the pixel shift on all of the pixels forming the left-viewpoint image a corresponding right-eye image is created. The calculations for the horizontal shift amount are explained in detail below.

For the projecting stereoscopic effect shown in FIG. 16A, based on a similarity relation between a triangle with vertices formed by the left-eye pupil L-View-Point, the right-eye pupil R-View-Point and the image formation point, and a triangle with vertices formed by the left-viewpoint pixel L-Pixel, the right-viewpoint pixel R-Pixel and the image formation point, when the viewer in not leaning the horizontal shift amount Px is related to the distance to the subject Z, the distance of the viewer from the display screen S and the pupil separation e as shown in MATH 3.

$$Px = e\left(1 - \frac{S}{Z}\right) [\text{cm}] \qquad \text{MATH 3}$$

The distance to the subject Z can be obtained from the depth of the graphic part. For the pupil separation e, an average separation for adult males of 6.4 cm is used. An appropriate viewing distance is considered to be three times the display screen height H, so the distance of the viewer from the display screen S is set as equal to 3H.

When for the display screen a number of pixels in the vertical direction is L and a number of pixels the horizontal direction is K, a length in the horizontal direction of one pixel is equal to the display screen width W divided by the number of horizontal pixels K, and a length in the vertical direction of one pixel is equal to the display screen height H divided by the number of vertical pixels L. Also by taking 1 inch to be equal to 2.54 cm, the horizontal shift amount Px can be expressed in terms of pixel units as in MATH 4.

$$Px = \frac{e}{2.54}\left(1 - \frac{S}{Z}\right) \times \frac{K}{W} [\text{pixel}] \qquad \text{MATH 4}$$

A value for a resolution (vertical pixel number L, horizontal pixel number K) of the display screen is obtained through a negotiation with an external display. Therefore, based on the above equation it is possible to calculate the horizontal shift amount Px. In the case of the retracting stereoscopic effect shown in FIG. 16B, the same relationship as described above is applicable. The above describes the method for calculating the horizontal pixel shift amount.

Figure 17:
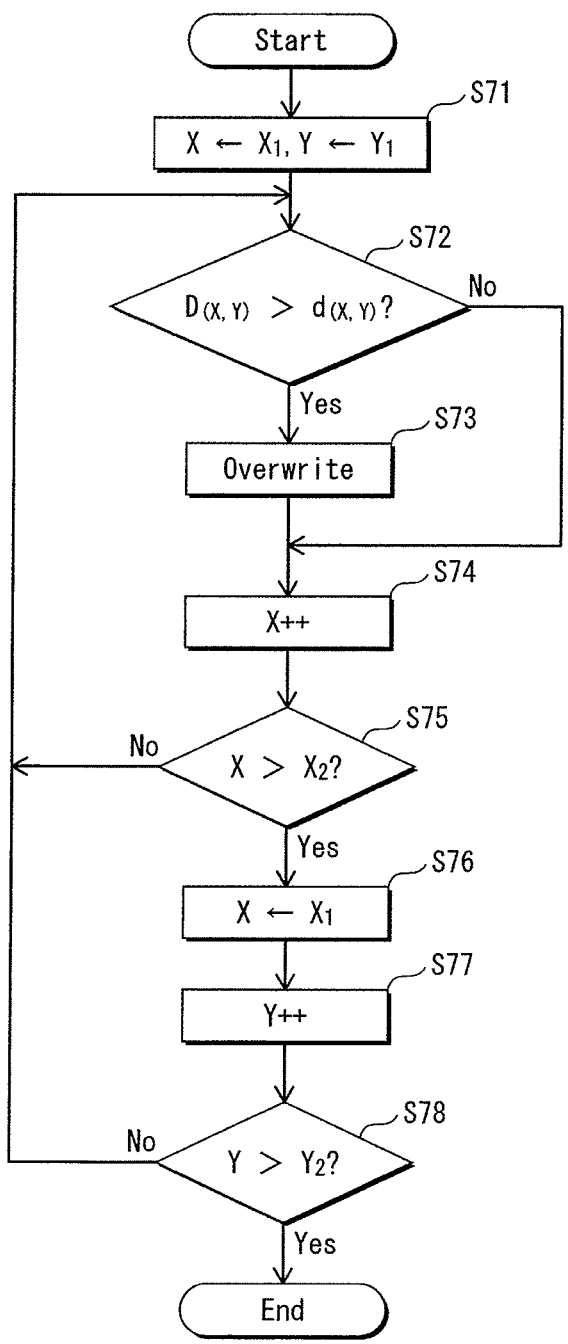
FIG. 17 is a flowchart showing a graphic part composition procedure.

During composition of the graphic part, depending on the depth of the graphic part a portion of the graphic part may become hidden behind subjects in the stereoscopic image. In a graphic part composing procedure executed in Step S62 and Step S64 of FIG. 15, composition of the stereoscopic image must be performed with consideration of relative depths of subjects in the stereoscopic image and the graphic part. FIG. 17 is a flowchart that shows in detail the graphic part composing procedure that is performed in Step S62 and Step S64. Composition of the graphic part with the left-viewpoint image is explained below.

In the graphic part composing procedure, coordinates (x, y) of a composing position are initialized as coordinates ($x_1$, $y_1$) of the top left corner of the area of the graphic part (Step S71), and subsequently procedures from Step S72 to Step S78 are performed in a loop.

In Step S72 it is determined whether a depth D (x, y) of the left-viewpoint image at the coordinates (x, y) is greater than the depth d of the graphic part. If the depth D (x, y) at the coordinates (x, y) in the left-viewpoint image is greater than the depth d of the graphic part (Step S72: Yes), a pixel at the coordinates (x, y) in the left-viewpoint image is overwritten with a pixel of the graphic part (Step S73).

After the pixel of the left-viewpoint image has been overwritten in Step S73, or if the depth D (x, y) at the coordinates (x, y) in the left-viewpoint image is smaller than the depth d of the graphic part (Step S72: No), the x coordinate of the composing position is incremented (Step S74), and it is determined whether an x coordinate of a new composing position after incrementing exceeds $x_2$ that is an x coordinate of the coordinates ($x_2$, $y_2$) at the bottom right corner of the area of the graphic part (Step S75).

If the x coordinate of the new composing position does not exceed $x_2$ (Step S75: No), procedures from Step S72 are repeated for the new composing position. If the x coordinate of the new composing position does exceed $x_2$ (Step S75: Yes), the x coordinate of the composing position is re-initialized as the coordinate $x_1$ (Step S76) and the y coordinate of the composing position is incremented (Step S77). After incrementing it is determined whether a y coordinate of a new composing position exceeds a value of the y coordinate $y_2$ of the coordinates ($x_2$, $y_2$) at the bottom right corner of the area of the graphic part (Step S78).

If in Step S78 the y coordinate of the new composing position does not exceed $y_2$ (Step S78: No), procedures from Step S72 are repeated for the new composing position. If the y coordinate of the new composing position does exceed $y_2$ (Step S78: Yes), image composition of all pixels within the area of the graphic part is complete, and therefore the graphic part composing procedure is complete.

The above describes composition of the graphic part with the left-viewpoint image. It is possible to compose the graphic part with the right-viewpoint image by shifting the top left corner coordinates ($x_1$, $y_1$) and the bottom right corner coordinates ($x_2$, $y_2$) of the area of the graphic part by the pixel shift amount calculated in Step S63 of FIG. 15, and performing the procedures shown in FIG. 17 using the shifted coordinates to create a composite right-viewpoint image.

The above describes the stereoscopic image creation procedure performed by the stereoscopic image creating unit 108.

In the present embodiment described above, possible depths for the graphic part are determined based on the depth information distribution at the planar position at which the graphic part is arranged by the user and the user is presented with alternatives for the depth of the graphic, thus enabling easy setting of the depth of the graphic.

Furthermore, by repeatedly changing the display size of the graphic part when selection of one of the alternatives is received and waiting for a determining operation by the user, the depth of the graphic part can be adjusted, based on the display size of the graphic part at the time of the determining operation, to a greater depth or a smaller depth than the depth corresponding to the selected alternative. The above feature allows a greater degree of freedom in setting the depth of the graphic part, and therefore improves usability.

Figure 18:
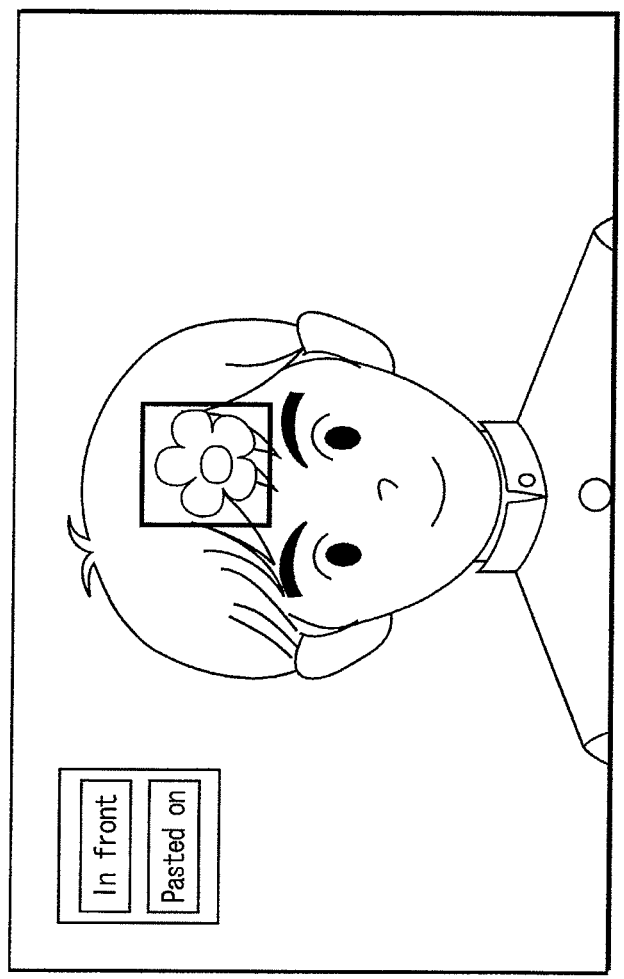
FIG. 18 shows a display example of a depth setting pop-up-menu with two alternatives.

The first embodiment was described for the situation shown in FIG. 8, wherein two subjects, the person in the foreground and the bus in the background, are present within the area of the graphic part, and the pop-up menu provides alternatives of "In front", "Pasted on" and "Behind" for the depth of the graphic part relative to the person. However, the number of alternatives presented in the pop-up menu is not limited to three. For example, in a situation such as shown in FIG. 18 where the graphic part is arranged so as to only overlap with the head of a person, just two alternatives of "In front" and "Pasted on" may be presented in the pop-up menu. Also, the pop-up menu is not limited to alternatives of "In front", "Pasted on" and "Behind", and instead four or more different alternatives may be presented.

(Second Embodiment)

In the user interface control device relating to the first embodiment, when the planar position for arranging the graphic part on the left-viewpoint image displayed in planar form on the display is indicated by the pointing device, subjects appearing within the area occupied by the graphic part in the left-viewpoint image are considered, and alternatives are presented corresponding to possible depths for positioning the graphic part, such as at a smaller depth, at a greater depth or at an equal depth to subjects appearing within the area of the graphic part.

However, when a viewpoint image is displayed in planar form, if a large number of subjects appear tightly packed in a narrow region it may be difficult to differentiate relative depths of the subjects. Also, if a large number of subjects are present within the area occupied by the graphic part there are a large number of possible depths for the graphic part such as at a smaller depth or at a greater depth than each of the subjects, therefore a large number of alternatives are presented to the user. When a large number of alternatives are presented it takes time for the user to find an alternative corresponding to a desired depth for the graphic part.

A user interface control device relating to a second embodiment extracts subjects with differing depths from depth map data acquired through stereo matching of two viewpoint images forming a stereoscopic image, and presents the extracted subjects in an emphasized form on a planar display of one of the viewpoint images, in order that a user can easily indicate a planar position for arranging a graphic part. Also, by receiving a selection of a subject, having a depth close to a desired depth of the graphic part, from among the emphasized subjects, the number of alternatives presented to the user can be reduced.

Figure 19:
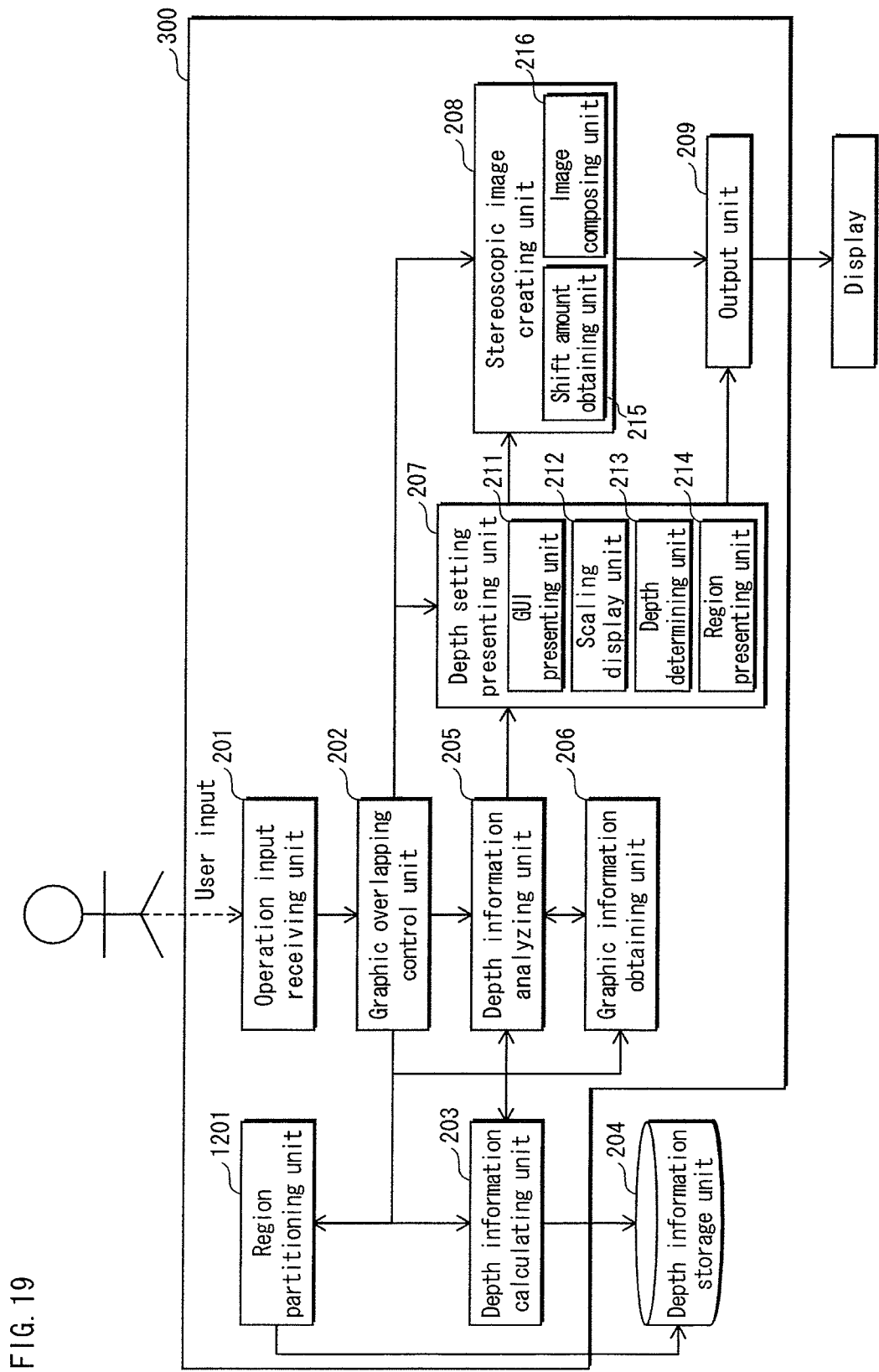
FIG. 19 is a block diagram showing the configuration of a user interface control device 300 relating to a second embodiment.

FIG. 19 shows the configuration of a user interface control device 300 relating to the second embodiment.

The user interface control device 300 comprises an operation input receiving unit 201, a graphic overlapping control unit 202, a depth information calculating unit 203, a depth information analyzing unit 205, a graphic information obtaining unit 206, a depth setting presenting unit 207, a stereoscopic image creating unit 208, an output unit 209, and a region partitioning unit 1201. The functions of the operation input receiving unit 201, the graphic overlapping control unit 202, the depth information calculating unit 203, the depth information analyzing unit 205, the graphic information obtaining unit 206, the depth setting presenting unit 207, the stereoscopic image creating unit 208, the output unit 209, and the region partitioning unit 1201, may for example be recorded in advance on the recording medium 70 shown in FIG. 1 as programs.

For the present embodiment, in a smart phone with the configuration shown in FIG. 1 the programs corresponding to the operation input receiving unit 201, the graphic overlapping control unit 202, the depth information calculating unit 203, the depth information analyzing unit 205, the graphics information obtaining unit 206, the depth setting presenting unit 207, the stereoscopic image creating unit 208, the output unit 209 and the region partitioning unit 1201 are loaded from the recording medium 70 to the RAM within the processing unit 100 and executed by the CPU within the processing unit 100, and thus are realized by the hardware resources (by coactions of the CPU and programs in the RAM).

The example above is for a configuration in which the programs are recorded on the recording medium 70 in advance, then loaded to RAM in the processing unit 100 and executed by the CPU in the processing unit 100. However, the programs listed above could alternatively be recorded on the RAM in the processing unit 100 in advance. If the programs are recorded on the RAM in the processing unit 100 in advance it may no longer be necessary for the programs to be recorded on the recording medium 70.

A depth information storage unit 204 is realized as a part of a recording region of the recording medium 70.

In the user interface control device 300 configuration elements other than the operation input receiving unit 201, the graphic information obtaining unit 206, the depth setting presenting unit 207 and the region partitioning unit 1201, are identical to the like-named elements in the user interface control device relating to the first embodiment shown in FIG. 2, therefore description of the identical elements is omitted in the present embodiment. The operation input receiving unit 201, the graphic information acquiring unit 206, the depth setting presenting unit 207, and the region partitioning unit 1201 are described below.

The region partitioning unit 1201 is configured to partition the left-viewpoint image into a plurality of subject regions in accordance with a brightness distribution and a depth information distribution of the stereoscopic image. Thus, the region partitioning unit 1201 realizes the function of the region partitioning unit. More specifically, when comparing brightness of surrounding pixels in the left-viewpoint image, if a brightness difference exceeds a predetermined threshold value, an edge part, where a sharp change in brightness occurs, is detected. The region partitioning unit 1201 partitions the left-viewpoint image into regions surrounded by edge parts such as described above. Next, the region partitioning unit 1201 reads the depth information for the left-viewpoint image from the recording medium 70 and if a difference in depth between two opposite sides of an edge exceeds a predetermined threshold value, the region partitioning unit 1201 determines that a region surrounded by the edge is a subject region.

Figure 20A:
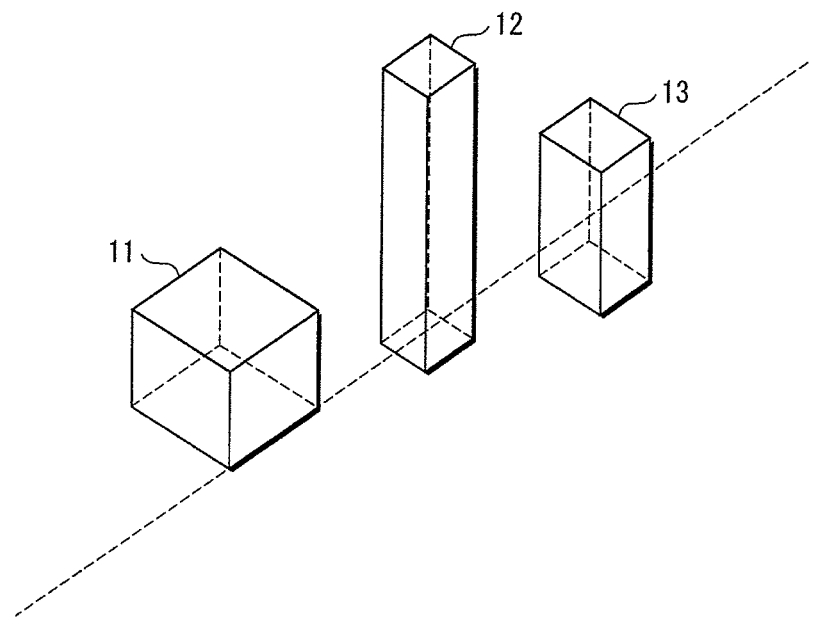
FIG. 20A shows an arrangement of subjects at time of capture of an image.
Figure 20B:
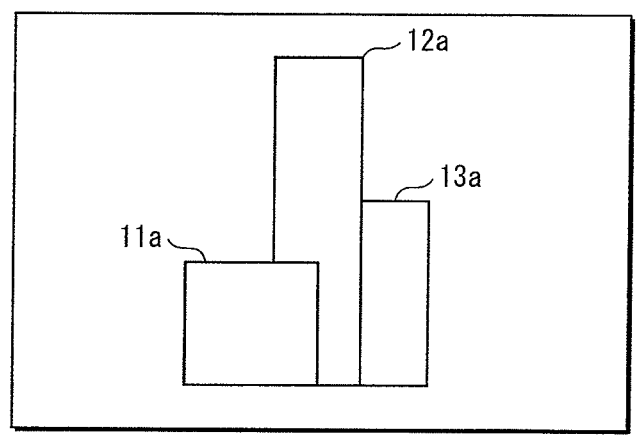
FIG. 20B shows a viewpoint image.

For a scene such as in FIG. 20A where three boxes 11-13 are subjects, when the scene is captured along the dotted-line a left-viewpoint image like in FIG. 20B is obtained. Through the use of an appropriate brightness threshold value, the region partitioning unit 1201 detects regions 11a-13a as different regions. The region partitioning unit 1201 reads from the recording medium 70, depth information of the left-viewpoint image for each of the regions. The region partitioning unit 1201 compares the depth of each of the regions 11a-13a with adjacent regions, and determines the region to be a subject region if all of the differences exceed the predetermined threshold value. Coordinate information relating to each subject region is recorded on the recording medium 70 through the depth information storage unit 204.

The depth setting presenting unit 207 includes a GUI display unit 211, a scaling display unit 212, and a depth determining unit 213 that respectively have the same functions as the GUI display 111, the scaling display unit 112 and the depth determining unit 113 explained for the first embodiment. The depth setting presenting unit 207 further includes a region presenting unit 214 which is configured to present subjects with different depths to the user in the left-viewpoint image shown on the display. Thus, the region presenting unit 214 realizes the function of the region presenting unit. The region presenting unit 214 presents the user with each of the subject regions detected by the region partitioning unit 1201 by displaying each of the subject regions with a different pattern or color thereon as shown for regions 11b-13b in FIG. 21A.

Figure 21A:
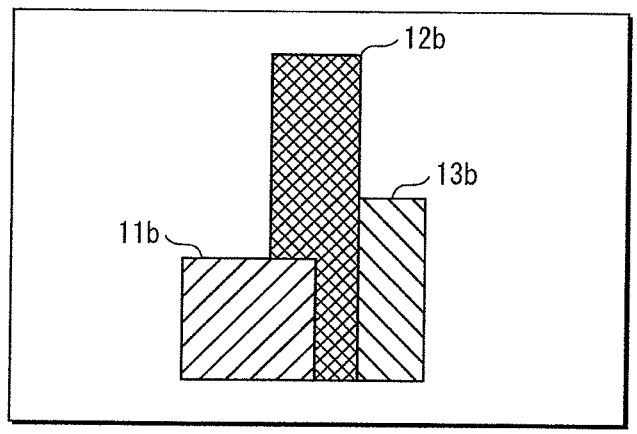
FIG. 21A shows a screen example for displaying subjects extracted from the image based on a depth distribution using a different color for each subject.
Figure 21B:
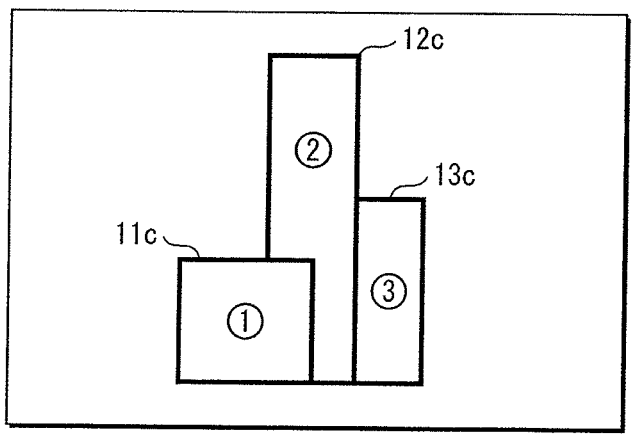
FIG. 21B shows a screen example for displaying subjects extracted from the image with numbers composed thereon.

Other methods may alternatively be used to help the user differentiate between the determined subject regions. The alternative methods, as shown in FIG. 21B, include composing text such as numbers on each of the subject regions 11c-13c, or displaying a processed image wherein edges of the subject regions 11c-13c are emphasized.

The operation input receiving unit 201 is configured to receive the same user operations as described for the input receiving unit 101 in the first embodiment, and is further configured to receive a user operation selecting one of the subject regions with differing depths presented by the region present presenting unit 214 as described above. Thus, the operation input receiving unit 201 realizes the function of the region receiving unit.

The graphic information obtaining unit 206 is configured to obtain coordinates of an area occupied by the graphic part in the left-viewpoint image shown on the display 200 in the same way as described for the graphic information obtaining unit 105 in the first embodiment. Thus, the graphic information obtaining unit 206 realizes the function of the planar position specifying unit. However, the graphic information obtaining unit 206 uses a method of obtaining the area occupied by the graphic part that differs from the graphic information obtaining unit 105. In the graphic information obtaining unit 105 the area of the graphic part is calculated using coordinates of a point at which the user drops the graphic part on the left-viewpoint image. In contrast, the graphic information obtaining unit 206 calculates the area of the graphic part using as central coordinates $(x_g, y_g)$ of the graphic part, central coordinates of one of the subject regions selected in an operation received by the operation input receiving unit 201.

The configuration of the user interface control device 300 relating to the second embodiment is described above.

Figure 22:
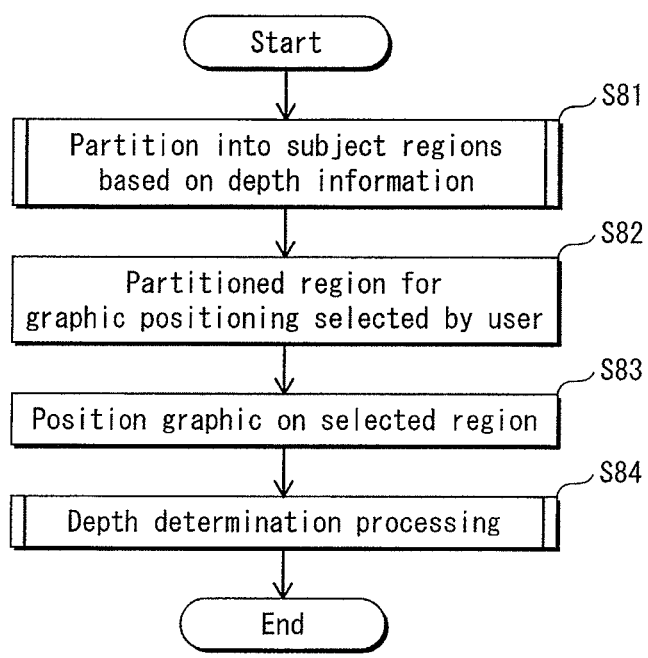
FIG. 22 is a flowchart showing stereoscopic image processing in the user interface control device 300.

Next the processing of stereoscopic images in the user interface control device 300 is described with reference to FIG. 22.

For processing of stereoscopic images in the user interface control device 300, first the region partitioning unit 1201 detects subject regions from the left-viewpoint image using brightness and depth information for the image. The region presenting unit 213 overlaps a different pattern on each of the detected subject regions in the left-viewpoint image shown on the display (Step S81). By selecting one of the patterned subject regions, such as shown in FIG. 21A, the user is able to indicate which of the subjects to overlap the graphic part on.

When an operation selecting one of the subject regions is received by the operation input receiving unit 201 (Step S82), the region presenting unit 214 first removes the pattern overlapping each of the subject regions and then renders the graphic part overlapping the selected subject region (Step S84).

The steps described above can be substituted for the steps in the first embodiment of indicating the planar position of the graphic part by performing a drop on the left-viewpoint image. Processing of the stereoscopic image can be continued using procedures shown for Step S12 onwards in FIG. 11 to determine the depth of the graphic part (Step S84).

Through the configuration relating to the present embodiment described above, even for a stereoscopic image where determination of which subject to overlap a graphic part on is complicated by a plurality of subjects being positioned closely together, by introducing a method of region partitioning based on brightness and depth information of the stereoscopic image, it is possible to select a planar position for the graphic part in terms of region units. Therefore, the configuration relating to the present embodiment can deal with various different photograph types and compositions while also improving usability.

(Supplementary Explanations)

Although the present invention has been explained based on the above embodiments, the invention is of course not limited to the above embodiments. The present invention also includes the following examples.

(a) In one aspect of the present invention may be a means of controlling an application disclosed in the procedure for each embodiment. Alternatively, one aspect of the present invention may be a computer program containing a program code for operating a computer in accordance with the procedure for each embodiment.

(b) The present invention may also be realized as an LSI for controlling the user interface control device recited in each of the embodiments listed above. This type of LSI is realized by integration of functional blocks included in the processing unit 100 in FIG. 2 and the user interface control device 300 in FIG. 19. Each of the functional blocks may be individually integrated into a single chip, or a part or all of the functional blocks may be integrated into a single chip.

The above description refers to LSI, however depending on the degree of integration it may also be called IC, system LSI, super LSI or ultra LSI.

Furthermore, the method for circuit integration is not limited to LSI and could alternatively be realized by a dedicated circuit or a general purpose processor. It is also possible to use an FPGA (Field Programmable Gate Array) programmable after manufacturing the LSI or a reconfigurable processor in which connection and setting of a circuit cell inside an LSI is reconfigurable after manufacturing the LSI.

Furthermore, if a new circuit integration technique that could replace LSIs were to arise from advances in semi-conductor technologies or semi-conductor derived technologies, the new technique could of course be used for the integration of functional blocks and other components. One possibility lies in adaptation of biotechnology.

In particular, through the configuration of integrated or dedicated circuits as explained above, it is possible to realize the functions of: specifying with respect to a graphic arranged on one of two viewpoint images forming a stereoscopic image, an area occupied by the graphic in the one viewpoint image; acquiring a depth of a subject appearing within the area occupied by the graphic in the one viewpoint image; presenting a first alternative and a second alternative for setting a depth of the graphic in the stereoscopic image, the first alternative corresponding to the depth of the subject, and the second alternative corresponding to a depth differing from the depth of the subject; receiving a selection by a user of one of the first alternative, the second alternative and the third alternative; changing a display size of the graphic repeatedly when the selection of the one alternative is received, until a determining command is received from the user; determining the graphic to have a depth smaller than a depth corresponding to the selected alternative when the determining command is received while the display size of the graphic is enlarged, and determining the graphic to have a depth greater than the depth corresponding to the selected alternative when the determining command is received while the display size of the graphic is reduced; obtaining a shift amount by calculating a disparity to produce a stereoscopic effect for the determined depth of the graphic and converting the disparity into a pixel number; composing the graphic with the one viewpoint image in the area specified by the planar position specifying unit, and composing the graphic with the other viewpoint image included in the two viewpoint images, in an area that corresponds to the area specified by the planar position specifying unit shifted in a horizontal pixel direction by the obtained shift amount; partitioning the one viewpoint image into a plurality of regions, each two adjacent of the partitioned regions differing in depth from each other by greater than a threshold value when shown in stereoscopic display; presenting each of the partitioned regions; and receiving a selection of one of the presented partitioned regions. Further alternatively, each of the functions recited above may be realized by a configuration in which there is coaction of the processor and a program in the memory.

(c) The first embodiment was described for a case in which the corresponding point search is performed on a scale of pixel units; however the corresponding point search is not limited to the scale of pixel units. For example, the corresponding point search may be performed on a scale of pixel block units such as 4×4 pixel blocks or 16×16 pixel blocks.

(d) The first embodiment was described for a case in which depths of subjects are converted into values from 0 to 255 on the 256 value scale, and depth information is created in the form of a grayscale image where a depth of each pixel is displayed as an 8-bit brightness. However, the present invention is not limited to the above case and for example depths of the subjects may be converted into values of 0 to 127 on a 128 value scale instead.

(e) The first embodiment was described for a case in which based on the area of the graphic part in the left-viewpoint image, the graphic part is overlapped on the right-viewpoint image after applying a disparity. However, the order can be reversed so that based on an area of the graphic part in the right-viewpoint image, the graphic part is overlapped on the right-viewpoint image after applying the disparity. In the above situation it is desirable that when receiving an indication of the planar position of the graphic part from the user the right-viewpoint image is displayed on the display.

(f) The first embodiment was described for a case in which a stereoscopic image is acquired that is formed from a left-viewpoint image and a right-viewpoint image having equal resolutions. However, the present invention is not limited to the above case and instead the two viewpoint images may have different resolutions. For two viewpoint images having different resolutions, by performing a resolution alteration procedure it is possible to created depth information from a corresponding point search, and by performing the pixel shift procedure on whichever of the two viewpoint images has a higher resolution, a stereoscopic image with high resolution is created. The depth information creation procedure requires a large amount of processing, therefore by performing the procedure on a low resolution image the amount of processing required can be reduced. Also, as a result of the above it is possible for a part of a capture device used to capture the stereoscopic image to be low-performance, thus costs of the capture device can be reduced.

(g) In the first embodiment, information relating to the size X inch display device, the aspect ratio m:n and the display screen resolution (vertical pixel number L, horizontal pixel number K) are acquired through the negotiation with the external display, however this is not a limitation on the present invention. Alternatively, the information relating to the display device type X, the aspect ratio m:n and the display screen resolution (vertical pixel number L, horizontal pixel number K) may be input by the user.

(i) In the first embodiment, in order to calculate the shift amount the distance S between the viewer and the display screen is taken to be three times the height 3H of the display screen, however this is not a limitation on the present invention. Alternatively, the distance S between the viewer and the screen may be calculated using a distance sensor such as a TOF (Time Of Flight) sensor.

(j) In the first embodiment, the pupil separation e is taken to be 6.4 cm, which is the average of adult males; however this is not a limitation on the present invention. Alternatively, the pupil separation e may be calculated from a facial image captured by a camera included within the display device, or the pupil separation e may be calculated in accordance with whether the viewer is determined to be an adult or a child, and whether the viewer is determined to be male or female.

(k) In the second embodiment, subject region partitioning is performed by partitioning the viewpoint image into regions based on the brightness distribution and the depth information distribution. However, the method of subject region partitioning is not limited to the above method. Subject region partitioning may be performed using only the depth information distribution, or alternatively by using only the brightness distribution to extract features points such as edges (parts where there is a sharp change in brightness) and crossing points of edges.

Edge detection may also be performed by calculating differences (primary differentials) in brightness between pixels, and then calculating sharpness of edges using the differences. Alternatively, feature points may be extracted using any other appropriate edge detecting method.

(l) In the first embodiment a GUI menu is displayed as a means of allowing the user to select the depth of the graphic, but alternatively any other method that allows a selection may be used. For example, a foreground, a subject and a background may be colored in order alternately for a predetermined time period, and by inputting a push operation on a button when a desired depth is colored, the user may select an approximate depth of the graphic. However, even for the method where the foreground, the subject and background are colored in order alternately, alternatives wherein the graphic part is hidden behind subjects are redundant and therefore are not displayed.

(m) In the first embodiment, the depth information calculating unit 103 may create depth information by measuring distances of subjects by using a distance sensor such as a TOF sensor. Alternatively, depth information may be acquired together with a monoscopic image from an external network, server or recording medium, or the acquired monoscopic image may be analyzed to create depth information. To create depth information from the monoscopic image, first the monoscopic image is divided into super-pixels which are clusters of pixels having similar properties such as brightness or color. Each of the super-pixels is compared to adjacent super-pixels and by analysis of changes such as in texture gradation, distances of subjects appearing in the monoscopic image can be estimated. The monoscopic image may also be in the form of image data captured by a capturing device such as a monoscopic camera. Also, the present invention is not limited to real-life picture images and instead may use CG images.

(n) In the first embodiment the default for the display position of the GUI menu is the top left corner, however the display position is not limited to the top left corner. Alternatively, the GUI menu may be moved and displayed at a position where the menu does not hide subjects appearing in the image or overlap with the area of a graphic part.

(o) In the second embodiment the stereoscopic image is partitioned into subject regions based on the brightness and depth information with no consideration of what each subject is. However, in subject region partitioning human figures or objects may be detected using some form of human or object recognition technique and the subject region partitioning could then be performed in combination with one of the partitioning methods recited in section (k) or in combination with the depth information distribution as in the second embodiment. Also, by allotting a number to each of the partitioned subject regions and displaying the number overlapping on the subject, the user can, by selecting one of the numbers, select a subject for overlapping the graphic part on.

(p) In the second embodiment, overlapping of the graphic part on human figures may be simplified by using a human recognition function to recognize human regions and then performing subject region partitioning.

(q) In the first embodiment a flower mark was given as an example of a graphic part, however the graphic part may instead be a human body part such as hair or lips, and a facial recognition function may be used to arrange the graphic part overlapping on a face at an appropriate position.

(r) In the first embodiment a flower mark was given as an example of the graphic part, however if the graphic part is a speech bubble, a facial recognition function may be used to detect a mouth region and position a starting point of the speech bubble so as to be coming out off the mouth region, or the facial recognition function may be used to position the speech bubble so that the speech bubble does not hide a face which is a subject in the image.

INDUSTRIAL APPLICABILITY

One aspect of the present invention is a user interface control device that can be used for processing of stereoscopic images in devices such as PCs, tablets, smartphones and cellular telephones, and allows a depth of a graphic part that is to be composed with a stereoscopic image to be easily set. The user interface control device is of particular use in image retouching applications.

REFERENCE SIGNS LIST 10 camera
20 speaker
30 GPS
40 sensor
50 touch panel
60 microphone
70 recording medium
100 processing unit
101, 201 operation input receiving unit
102 control unit
103, 203 depth information calculating unit 104, 204 depth information storage unit
105, 206 graphic information obtaining unit
106, 205 depth information analyzing unit
107, 207 depth setting presenting unit
108, 208 stereoscopic image creating unit
109, 209 output unit
111, 211 GUI presenting unit
112, 212 scaling display unit
113, 213 depth determining unit
114, 215 shift amount obtaining unit
115, 216 image composing unit
200 display
202 graphic overlapping control unit
214 region presenting unit
300 user interface control device
1201 region partitioning unit

The invention claimed is:

1. A control device, comprising:
a processor; and
a memory storing instructions that, when executed by the processor, cause the processor to perform operations including:
acquiring a stereoscopic image of a subject, the stereoscopic image including a first viewpoint image and a second viewpoint image;
specifying a placement position of a graphic part on the first viewpoint image;
calculating a rendering area of the graphic part on the placement position of the first viewpoint image;
acquiring a position of a first viewpoint subject displayed on the first viewpoint image, wherein the first viewpoint subject coincides with the rendering area of the graphic part;
calculating first depth information of the graphic part in the stereoscopic image according to a relative position of the graphic part to the position of the first viewpoint subject;
acquiring second and third depth information of the first viewpoint subject, the second depth information indicating a smaller depth than the first depth information and the third depth information indicating a greater depth than the first depth information;
presenting a first alternative, a second alternative, and a third alternative for setting a depth of the graphic part in the stereoscopic image, the first alternative representing the first depth information, the second alternative representing the second depth information, and the third alternative representing the third depth information; and
pasting the graphic part in the stereoscopic image according to a selection of one of the first alternative, the second alternative, or the third alternative, the graphic part not being originally included in the stereoscopic image in the acquiring.

2. The control device in claim 1,
wherein the first viewpoint subject includes one or more subjects,
the first alternative corresponds to a depth of a first subject, which is a smallest depth among depths of the one or more subjects, and
the second alternative corresponds to a depth less than the smallest depth.

3. The control device in claim 2,
wherein when the first viewpoint subject further includes a second subject, and a difference between the smallest depth and a depth of the second subject is greater than a threshold value,
the third depth information indicates an intermediate depth between the smallest depth and the depth of the second subject.

4. The control device in claim 3,
wherein the processor further performs operations including:
receiving a selection by a user of one of the first alternative, the second alternative and the third alternative,
when the selection of the one alternative is received, repeatedly changing a display size of the graphic part until a determining command is received from the user,
determining the graphic part to have a depth smaller than a depth corresponding to the selected alternative when the determining command is received while the display size of the graphic part is enlarged, and
determining the graphic part to have a depth greater than the depth corresponding to the selected alternative when the determining command is received while the display size of the graphic part is reduced.

5. The control device in claim 4,
wherein when the selection of the third alternative is received, the processor further performing operations including:
determining the depth of the graphic part, based on the display size of the graphic part at the time of reception of the determining command, by setting a display size of the graphic part at maximum enlargement to correspond to the smallest depth, and a display size of the graphic part at maximum reduction to correspond to the depth of the second subject.

6. The control device in claim 4,
wherein when a depth of one of the one or more subjects is greater than the depth corresponding to the selected alternative, the processor further performing operations including:
determining the depth of the graphic part, based on the display size of the graphic part at the time of reception of the determining command, by setting a display size of the graphic part at maximum reduction to correspond to the depth of the one of the one or more subjects greater than the depth corresponding to the selected alternative.

7. The control device in claim 4,
wherein when a depth of one of the one or more subjects is smaller than the depth corresponding to the selected alternative, the processor further performing operations including:
determining the depth of the graphic part, based on the display size of the graphic part at the time of reception of the determining command, by setting a display size of the graphic part at maximum enlargement to correspond to the depth of the one of the one or more subjects smaller than the depth corresponding to the selected alternative, and
when no depth of the one or more subjects is smaller than the depth corresponding to the selected alternative, determining the depth of the graphic part, based on the display size of the graphic part at the time of reception of the determining command, by setting the display size of the graphic part at maximum enlargement to correspond to a depth smaller than the depth corresponding to the selected alternative by a predetermined amount.

8. The control device in claim 4, wherein the processor further performing operations including:

obtaining a shift amount by calculating a disparity to produce a stereoscopic effect for the determined depth of the graphic part and converting the disparity into a pixel number, composing the graphic part with the first viewpoint image in the rendering area, and composing the graphic part with the second viewpoint image, in an area that corresponds to the placement position shifted in a horizontal pixel direction by the obtained shift amount.

9. The control device in claim 1, wherein the second depth information of the first viewpoint subject is acquired by stereo matching of the first viewpoint image and the second viewpoint image.

10. The control device in claim 1, wherein the processor further performing operations including:

partitioning the first viewpoint image into a plurality of regions, each two adjacent of the partitioned regions differing in depth from each other by greater than a threshold value when shown in stereoscopic display, presenting the partitioned regions, and receiving a selection of one of the presented partitioned regions, wherein the rendering area of the graphic part in the first viewpoint image includes at least a part of the selected partitioned region.

11. The control device in claim 10, wherein the partitioned regions are each displayed in a different color from adjacent regions.

12. The control device in claim 10, wherein each of the partitioned regions is presented with different text composed thereon.

13. The control device in claim 10, wherein the first viewpoint image is partitioned by (i) specifying a border of each of the regions by extracting edges and points of intersection of edges where a sharp change in brightness between adjacent pixels of the first viewpoint image occurs, and (ii) using a depth of each pixel in the first viewpoint image, acquired by stereo matching of the first viewpoint image and the second viewpoint image, to determine whether each two of the adjacent regions differ in depth by greater than the threshold value when shown in stereoscopic display.

14. A control method, comprising:

acquiring a stereoscopic image of a subject, the stereoscopic image including a first viewpoint image and a second viewpoint image;

specifying a placement position of a graphic part on the first viewpoint image;

calculating a rendering area of the graphic part on the placement position of the first viewpoint image;

acquiring a position of a first viewpoint subject displayed on the first viewpoint image, wherein the first viewpoint subject coincides with the rendering area of the graphic part;

calculating first depth information of the graphic part in the stereoscopic image according to a relative position of the graphic part to the position of the first viewpoint subject;

acquiring second and third depth information of the first viewpoint subject, the second depth information indicating a smaller depth than the first depth information and the third depth information indicating a greater depth than the first depth information;

presenting a first alternative, a second alternative, and a third alternative for setting a depth of the graphic part in the stereoscopic image, the first alternative representing the first depth information, the second alternative representing the second depth information, and the third alternative representing the third depth information; and pasting the graphic part in the stereoscopic image according to a selection of one of the first alternative, the second alternative, or the third alternative, the graphic part not being originally included in the stereoscopic image in the acquiring.

15. A computer-readable non-transitory recording medium storing a computer program, the computer program causing a computer to execute:

acquiring a stereoscopic image of a subject, the stereoscopic image including a first viewpoint image and a second viewpoint image;

specifying a placement position of a graphic part on the first viewpoint image;

calculating a rendering area of the graphic part on the placement position of the first viewpoint image;

acquiring a position of a first viewpoint subject displayed on the first viewpoint image, wherein the first viewpoint subject coincides with the rendering area of the graphic part;

calculating first depth information of the graphic part in the stereoscopic image according to a relative position of the graphic part to the position of the first viewpoint subject;

acquiring second and third depth information of the first viewpoint subject, the second depth information indicating a smaller depth than the first depth information and the third depth information indicating a greater depth than the first depth information;

presenting a first alternative, a second alternative, and a third alternative for setting a depth of the graphic part in the stereoscopic image, the first alternative representing the first depth information, the second alternative representing the second depth information, and the third alternative representing the third depth information; and pasting the graphic part in the stereoscopic image according to a selection of one of the first alternative, the second alternative, or the third alternative, the graphic part not being originally included in the stereoscopic image in the acquiring.

16. An integrated circuit, comprising:

a processor; and a memory storing instructions that, when executed by the processor, cause the processor to perform operations including:

acquiring a stereoscopic image of a subject, the stereoscopic image including a first viewpoint image and a second viewpoint image;

specifying a placement position of a graphic part on the first viewpoint image;

calculating a rendering area of the graphic part on the placement position of the first viewpoint image;

acquiring a position of a first viewpoint subject displayed on the first viewpoint image, wherein the first viewpoint subject coincides with the rendering area of the graphic part;

calculating first depth information of the graphic part in the stereoscopic image according to a relative position of the graphic part to the position of the first viewpoint subject;

acquiring second and third depth information of the first viewpoint subject, the second depth information indicating a smaller depth than the first depth information and the third depth information indicating a greater depth than the first depth information;

presenting a first alternative, a second alternative, and a third alternative for setting a depth of the graphic part in the stereoscopic image, the first alternative representing the first depth information, the second alternative representing the second depth information, and the third alternative representing the third depth information; and pasting the graphic part in the stereoscopic image according to a selection of one of the first alternative, the second alternative, or the third alternative, the graphic part not being originally included in the stereoscopic image in the acquiring.

17. The control device in claim 1,
wherein the acquired stereoscopic image of the subject includes depth information of the subject.

18. The control device in claim 1,
wherein the stereoscopic image of the subject is acquired by a stereo camera, the subject including a person and a vehicle, the graphic part is an image for decorating the person or vehicle, and the pasting is executed upon reception of a drag and drop operation performed on the graphic part, the pasting including moving the graphic part from a region on a screen to the rendering area.

* * * * *